(12) United States Patent
Saarikivi et al.

(10) Patent No.: US 8,379,864 B2
(45) Date of Patent: Feb. 19, 2013

(54) SOFTWARE PLUG-IN FRAMEWORK TO MODIFY DECRYPTION METHODS IN TERMINALS

(75) Inventors: Tuomo Saarikivi, Helsinki (FI); Dominique Müller, Helsinki (FI)

(73) Assignee: Nokia Corporation (FI)

( * ) Notice: Subject to any disclaimer, the term of this patent is extended or adjusted under 35 U.S.C. 154(b) by 1264 days.

(21) Appl. No.: 10/888,575

(22) Filed: Jul. 9, 2004

(65) Prior Publication Data

US 2006/0008088 A1    Jan. 12, 2006

(51) Int. Cl.
 *H04L 29/06* (2006.01)
(52) U.S. Cl. ............. 380/278; 380/277; 380/44; 726/26
(58) Field of Classification Search .................. 380/277, 380/278
 See application file for complete search history.

(56) References Cited

U.S. PATENT DOCUMENTS

| | | | |
|---|---|---|---|
| 4,535,355 A * | 8/1985 | Arn et al. ...................... | 380/212 |
| 4,551,720 A | 11/1985 | Levin | |
| 5,659,615 A * | 8/1997 | Dillon .......................... | 713/162 |
| 5,787,172 A | 7/1998 | Arnold | |
| 5,983,350 A | 11/1999 | Minear et al. | |
| 6,026,167 A | 2/2000 | Aziz | |
| 6,061,454 A | 5/2000 | Malik et al. | |
| 6,222,924 B1 * | 4/2001 | Salomaki ...................... | 380/200 |
| 6,226,618 B1 * | 5/2001 | Downs et al. ..................... | 705/1 |
| 6,850,252 B1 | 2/2005 | Hoffberg | |
| 6,909,723 B1 | 6/2005 | Yonge, III et al. | |
| 2001/0023445 A1 * | 9/2001 | Sundqvist ..................... | 709/228 |
| 2002/0021809 A1 | 2/2002 | Salo | |
| 2002/0055366 A1 | 5/2002 | Maggenti | |
| 2003/0046686 A1 * | 3/2003 | Candelore et al. .............. | 725/31 |

(Continued)

FOREIGN PATENT DOCUMENTS

| | | |
|---|---|---|
| EP | 1549069 A1 | 6/2005 |
| WO | 99/49717 A2 | 10/1999 |

(Continued)

OTHER PUBLICATIONS

Ahmavaara K., Jalma P., and Raivio Y., "Broadcast and Multicast Services in Mobile Networks", Sep. 22-27, 2002, XVII World Telecommunication Congress 2002 (WTC 2002), Paris, France.*

(Continued)

*Primary Examiner* — Kim Vu
*Assistant Examiner* — Yogesh Paliwal
(74) *Attorney, Agent, or Firm* — Banner & Witcoff, Ltd.

(57) ABSTRACT

The present invention provides methods, apparatuses, and systems for delivering protected multi-media content to a receiving device. Protected multi-media content and key information are inserted in a same time slice burst. A receiving device receives the time slice burst with the content datagrams and the key information and decrypts the content datagrams with the key information. Key datagrams may be associated with a higher priority level than content datagrams. Consequently, a receiving device can process a key datagram in order to extract a key before routing associated content datagrams to a message stack. A key may be encrypted at one or two levels of encryption. Additionally, a new security plug-in software module may be deployed at a receiving device. The new security plug-in software module is configured as an installation package that is encrypted as a protected message and that is decrypted by the receiving device.

23 Claims, 27 Drawing Sheets

U.S. PATENT DOCUMENTS

| | | | |
|---|---|---|---|
| 2003/0081776 A1 | 5/2003 | Candelore | |
| 2003/0152107 A1* | 8/2003 | Pekonen | 370/473 |
| 2004/0062398 A1 | 4/2004 | Unger | |
| 2004/0148501 A1 | 7/2004 | Livaditis et al. | |
| 2004/0181666 A1 | 9/2004 | Candelore | |
| 2004/0221163 A1 | 11/2004 | Jorgensen et al. | |
| 2005/0094812 A1 | 5/2005 | Terekhova | |
| 2005/0100167 A1 | 5/2005 | Alve | |

FOREIGN PATENT DOCUMENTS

| | | |
|---|---|---|
| WO | 03/005145 A2 | 1/2003 |
| WO | WO 03059039 | 7/2003 |

OTHER PUBLICATIONS

Refik Molva, "Internet security architecture", Computer Networks, Amsterdam, Netherlands: 1999, vol. 31, No. 8.*

Open Mobile Alliance Releases Working Drafts for OMA DRM Version 2.0, published on May 31, 2004.*

Korean Office Action dated Jul. 23, 2008.

A. Menezes, et al. Handbook of Applied Cryptography, CRC Press, 1996.

NIST (National Institute of Standards and Technology), AES Key Wrap Specification, Nov. 16, 2001.

China Patent Appln. No. 200580023314.1 OA dated Feb. 12, 2010.

IP Datacasting Content Services White Paper, Sonera MediaLab, May 13, 2003.

RFC2406, IP Encapsulating Security Payload (ESP), S. Kent, 22 pages, Nov. 1998.

DVB Interim Specification—Digital Video Broadcasting, IP Datacast Baseline Specification of Interface I_MT, DVB Document A080, 37 pages, Apr. 2004.

Chinese Patent Application No. 200580023151.8—Office Action dated Jun. 22, 2011.

Chinese Patent Application No. 2005800231518—Decision of Rejection dated Mar. 1, 2012.

* cited by examiner

SOFTWARE PLUG-IN FRAMEWORK TO MODIFY DECRYPTION METHODS IN TERMINALS

FIELD OF THE INVENTION

This invention relates to delivering protected multi-media content. In particular, the invention provides apparatuses and methods for communicating protected multi-media content, for encrypting associated keys, and for deploying security modules at receiving devices.

BACKGROUND OF THE INVENTION

Video streaming, data streaming, and broadband digital broadcast programming are increasing in popularity in wireless network applications, e.g., Internet Protocol (IP) multicast services. To support these wireless applications, wireless broadcast systems transmit data content that support data services to many wireless terminals simultaneously. Digital media content or other data is broadcasted using various application protocols, transport protocols and network protocols. For example, a broadcast system provides IP data broadcast where audio-visual service is transmitted so that MPEG4-AVC video, MPEG4-AAC audio and auxiliary data components are packetized and encapsulated to RTP and/or ALC. The packets are subsequently formatted to UDP and IP and transmitted over MPE in MPEG2-TS (for example DVB-H). In a packet-switched domain, the concept of a multi-media session may require that one or more session components (audio, video and auxiliary data in above case) are logically bound together. The portions of the multi-media session are sent between a common start time and end time. However, with a broadcast environment all receivers that are able to receive the broadcast signal can receive the data carried by the broadcast signal. It is important that the content seller limits access to multi-media content so that only entitled receivers can present the multi-media content to users.

In order to enhance revenue collections, a user is often permitted to access premium multi-media services only if the user subscribes to the service or orders the service (e.g., pay per view). However, without effectively controlling access by the content seller, a user may access the content without paying for the content if the user bypasses the protection mechanism.

What are needed are apparatuses, methods, and systems that facilitate adequate control procedures that effectively limit access to multi-media content.

BRIEF SUMMARY OF THE INVENTION

An aspect of the present invention provides methods, apparatuses, and systems for delivering protected multi-media content to a receiving device. Portions of protected multi-media content and associated key information are inserted in a same time slice burst. Consequently, key information may be frequently changed while maintaining synchronization with the multi-media content. In one embodiment of the invention, time slice bursts are sent from transmitting apparatus to a receiving device by a communications system that includes a DVB-H system, a DVB-T system, an ATSC system, and an ISDB-T system.

With an aspect of the invention, multi-media content is partitioned into components. Multi-media content is processed into a plurality of content datagrams, in which each content datagram is associated with a corresponding component. Key information is processed as at least one keystream that is logically separate from the components, even though the key information is inserted in the same time slice burst as the associated multi-media content. A keystream comprises a plurality of key datagrams, each key datagram containing a key that is associated with at least one content datagram. A content datagram may be encrypted with an associated key. A receiving device receives the time slice burst with the plurality of content datagrams and associated key datagrams of the at least one keystream. The receiving device consequently decrypts the plurality of content datagrams.

With another aspect of the invention, key information is processed as key datagrams that are included with at least one component. Each component comprises an associated plurality of content datagrams. A content datagram may be encrypted with an associated key.

With another aspect of the invention, static security data is sent to a receiving device by transmitting the static security data separately from the time slice burst that carries content information and associated key information. In one embodiment of the invention, a transmitting apparatus transmits the static security data in an electronic service guide (ESG).

With another aspect of the invention, key datagrams are associated with a higher priority level than content datagrams. Consequently, a receiving device can process a key datagram in order to extract a key before routing associated content datagrams to a message stack and decrypting the associated content datagrams.

With another aspect of the invention, a key is encrypted at a level of encryption. The encrypted key may be further encrypted with an additional level of encryption. A receiving device processes the encrypted key in order to obtain the decrypted key. The receiving device subsequently decrypts received content with the decrypted key.

With another aspect of the invention, a new security plug-in software module is deployed at a receiving device to replace a current security plug-in software module. In one embodiment of the invention, the new security plug-in software module is configured as an installation package that is encrypted as a protected message. The receiving device receives the protected message over a communications channel. The receiving device decrypts the protected message to obtain the installation package. Consequently, the new security plug-in software module is installed by executing the installation package.

BRIEF DESCRIPTION OF THE DRAWINGS

A more complete understanding of the present invention and the advantages thereof may be acquired by referring to the following description in consideration of the accompanying drawings, in which like reference numbers indicate like features and wherein.

DETAILED DESCRIPTION OF THE INVENTION

In the following description of the various embodiments, reference is made to the accompanying drawings which form a part hereof, and in which is shown by way of illustration various embodiments in which the invention may be practiced. It is to be understood that other embodiments may be utilized and structural and functional modifications may be made without departing from the scope of the present invention.

Figure 1:
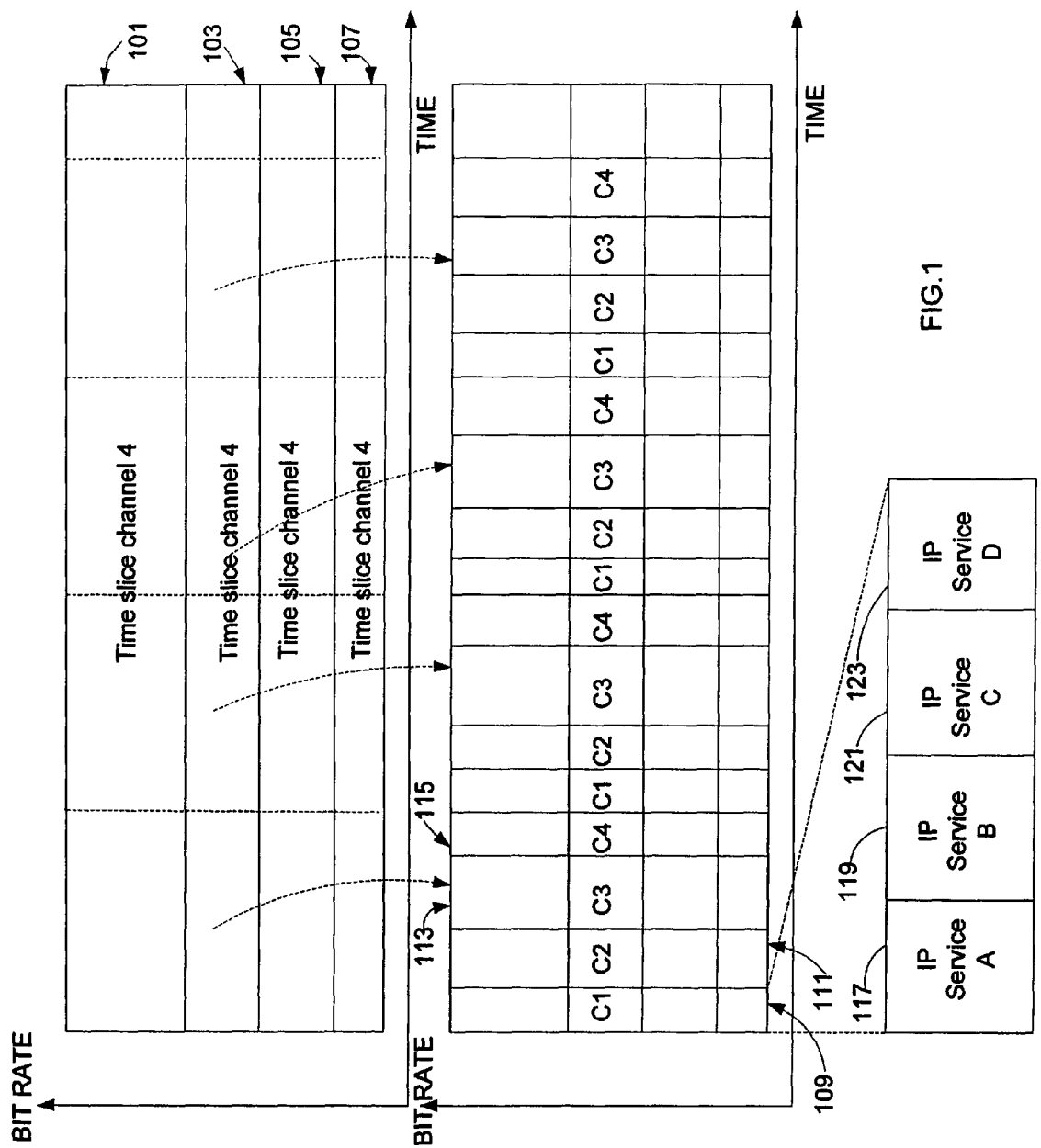
FIG. 1 shows transmission of Internet Protocol (IP) services utilizing time slice transmission in accordance with an embodiment of the invention.

FIG. 1 shows transmission of Internet Protocol (IP) services utilizing time slice transmission in accordance with an embodiment of the invention. A base station broadcasts data packets for a plurality of IP services using data streams 101, 103, 105, and 107. (Each data stream is allocated a portion of a data rate capacity.) In the embodiment, the base station may support functionality that is typically assumed by a base transceiver station (BTS), a base station controller (BSC), a combination of a BTS and a BSC, and a node B, which is a third Generation (3G) designation of a base transceiver station. Data transmission is essentially continuous such that data packets for an IP service are continuously being conveyed through a data stream.

In order to mitigate the loss of data packets, data streams 101, 103, 105, and 107 are mapped by base stations into bursts of data packets 109, 111, 113, and 115, respectively, in which bursts are transmitted over radio channels rather than data streams 101, 103, 105, and 107. Each data stream (101, 103, 105, and 107), and consequently each burst (109, 111, 113, and 115), supports at least one data service. Thus, each burst may support a plurality of data services (e.g., a group of related data services).

Data rates associated with bursts 109, 111, 113, and 115 are typically greater than data rates that are associated with data streams 101, 103, 105, and 107 so that a corresponding number of data packets can be sent in a shorter amount of time. In the embodiment, data streams 101, 103, 105, and 107 correspond to continuous data rates of approximately 100 Kbit/sec. Bursts 109, 111, 113, and 115 typically correspond to approximately 4 Mbit/sec (but may be in excess of 10 Mbit/sec) with an approximate one second duration. However, other embodiments may use different data rates for data streams 101-107 and for bursts 109-115.

In the embodiment, the entire data rate capacity is allocated to a burst at a given time. As shown in FIG. 1, bursts 109, 111, 113, and 115 are interleaved in time. An idle time duration (during which data packets are not transmitted for the particular data service) occurs between consecutive transmissions of a burst (e.g., burst 109). A wireless broadcast system can utilize the idle time duration during which the wireless terminal can be instructed to transfer to another base station to complete a handover. The other base station may transmit the same data as the base station previously serving the wireless terminal using a different center frequency and a different amount of phase shift. The utilization of time slicing enables a terminal to reduce the consumption of electrical power that is provided by a power source (typically a battery).

Bursts are typically transmitted periodically by a base station. For example, a subsequent burst may occur T seconds after burst 109, in which a burst is transmitted every T seconds. The wireless terminal may maintain precise timing, as with the Global Positioning System (GPS), to determine an absolute time at which each burst occurs. In another embodiment, the wireless terminal is provided information about a time period in each burst, informing the wireless terminal about the subsequent burst. With an embodiment of the invention, the time period information includes a real-time parameter (corresponding to "delta-t" with DVB-H) that indicates a time interval from the beginning of a time slice burst to the beginning of the next time slice burst of the same service and that is signaled in a MPE section header. The time period may be included in an IP packet, a multiprotocol encapsulated frame, any other packet frame, and a third generation (3G) or General Packet Radio Service (GPRS) channel or modulation data, such as transmitter parameter signaling. Alternatively, the wireless terminal may detect an occurrence of a burst by receiving a signal preamble, which may be a data sequence that is known a priori to the wireless terminal. In another embodiment, the wireless terminal may receive an overhead message on an overhead channel from a base station. The overhead message may contain timing information regarding the occurrence of bursts. The overhead channel may be logically or physically distinct from the downlink radio channel that supports the transmission of bursts.

Bursts 109, 111, 113, and 115 may be formatted by using a multi-protocol encapsulation in accordance with Section 7 of European Standard EN 301 192 "Digital Video Broadcasting (DVB), DVB specification for data broadcasting." The encapsulation may conform to Internet Protocol (IP) standards.

In an embodiment of the invention, a Digital Video Broadcast (DVB-H) provides mobile media services to wireless terminals, e.g., handheld wireless units. In the embodiment, the DVB-H system is compatible with DVB-T (digital video broadcast for terrestrial operation) and supports enhancements to better support operation of wireless handheld terminals. The DVB-H system supports Internet Protocol (IP) based data services in which the information may be transmitted as IP datagrams. The DVB-H system incorporates enhancements (with respect to a DVB-T system) that facilitates access to IP based DVB services on wireless handheld wireless terminals. (Alternative embodiments of the invention support variations of digital video broadcast systems including DVB-T, ATSC, and ISDB-T.) The DVB-H enhancements are based on the physical layer of the DVB-T physical layer with a number of service layer enhancements aimed at improving battery life and reception in the handheld environment. Thus, the DVB-H enhancements compliment existing digital terrestrial services, offering service providers the possibility to extend the market to the wireless handheld market.

Figure 2:
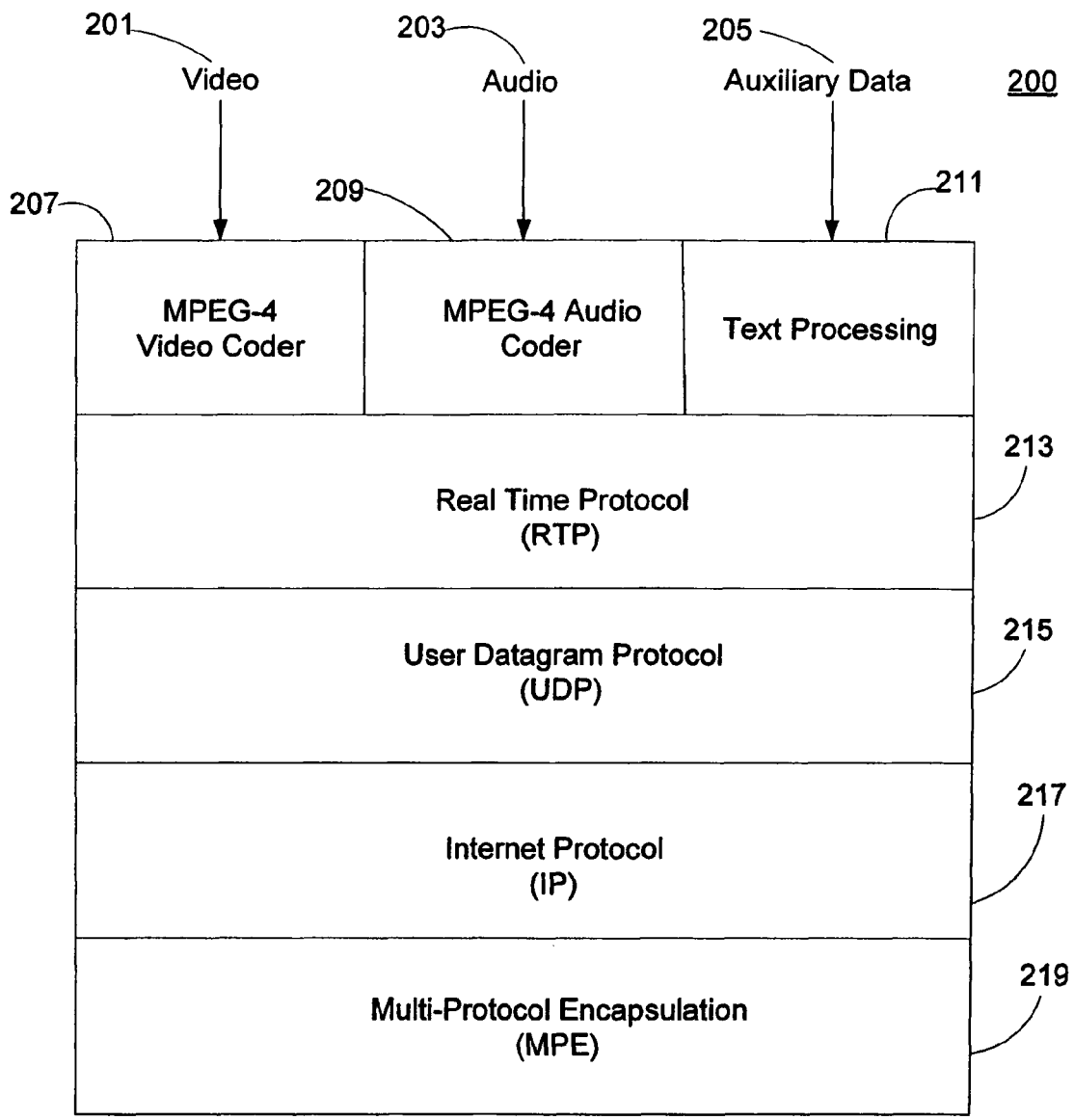
FIG. 2 shows a protocol stack that supports transmission of multi-media data in accordance with an embodiment of the invention.

FIG. 2 shows an internet protocol (IP) stack 200 that supports transmission of multi-media data in accordance with an embodiment of the invention. Digital media content or other data is broadcasted using various application protocols, transport protocols and network protocols. With IP stack 200, an IP data broadcast supports an audio-visual service having MPEG4-AVC video 201, MPEG4-AAC audio 203 and auxiliary data 205 components. Each component (201, 203, or 205) is processed by coder 207, coder 209, or coder 211 in order to obtain packets that are formatted for Real Time Protocol (RTP) layer 213. The packets (datagrams) are subsequently processed by UDP (user datagram protocol) layer 215 and Internet Protocol (IP) layer 217. Datagrams are associated with time slice bursts by formatting the datagrams using a multi-protocol encapsulation (typically corresponding to a link layer in the OSI model) such as, for example, in accordance with Section 7 of European Standard EN 301 192 "Digital Video Broadcasting (DVB), DVB specification for data broadcasting." The encapsulation may conform to Internet Protocol (IP) standards.

A multi-media session typically is associated with one or more session components (audio, video and auxiliary data in above case) that are logically bound together. The parts of the session are sent between a common start time and end time. Both start time and/or end time of can be either defined or undefined.

Figure 3:
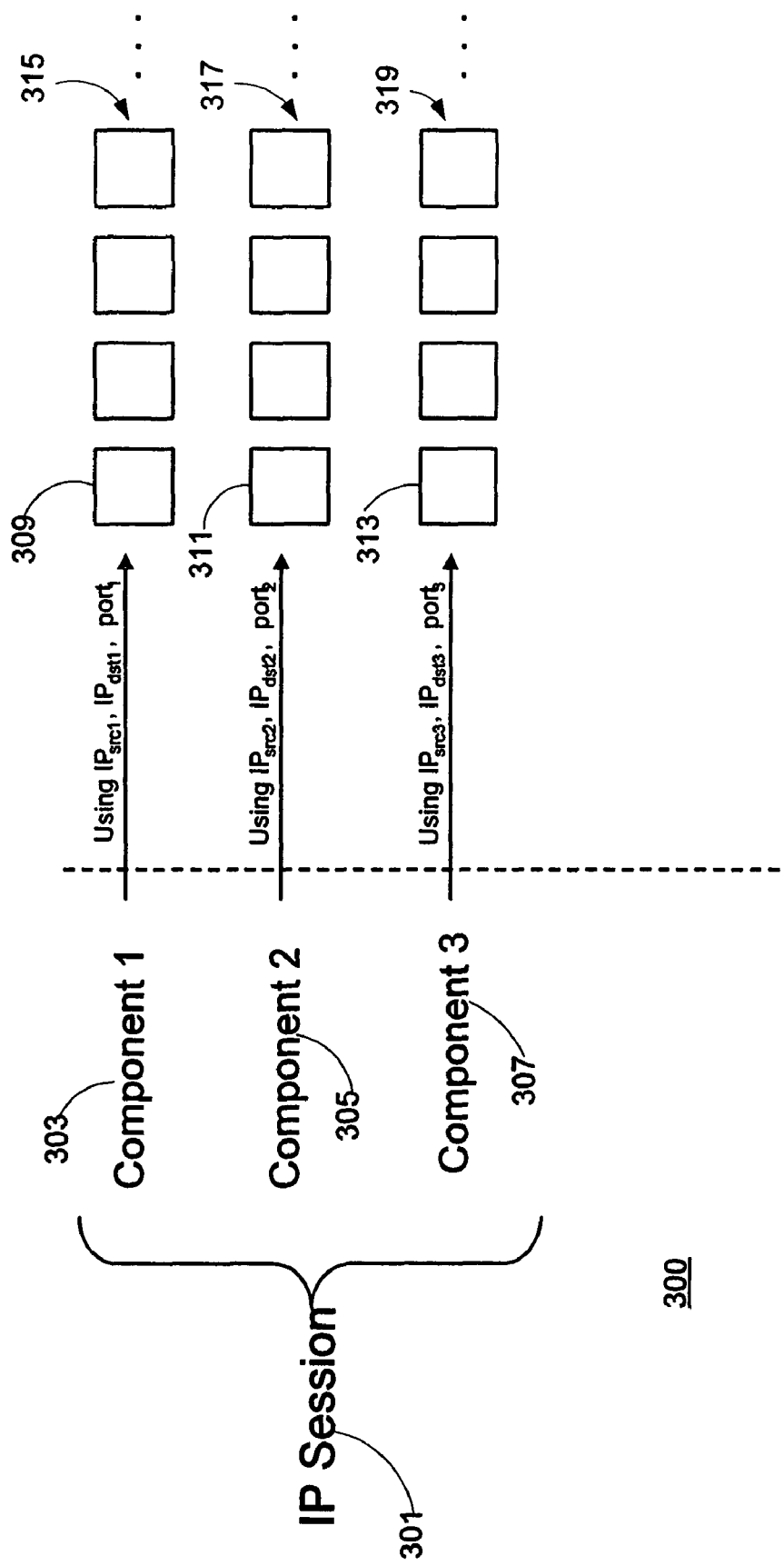
FIG. 3 shows a component configuration for a multi-media session according to an embodiment of the invention.

FIG. 3 shows a component configuration 300 for a multi-media session 301 according to an embodiment of the invention. Component 303 corresponds to a plurality of datagrams (including datagrams 309 and 315); component 305 corresponds to a plurality of datagrams (including datagrams 311 and 317); and component 307 corresponds to a plurality of datagrams (including datagrams 313 and 319). Components 303, 305, and 307 are transmitted within IP packets that are encapsulated to messaging of an underlying bearer layer. Each component 303, 305, and 307 has a defined source IP address, destination IP address, and port used in the IP packets that carry data associated with the component. Different components may have an independently defined source IP address, a destination IP address, and a port. In variations of the embodiment, a multi-media session may have a different number of components.

While exemplary component configuration 300 shows datagram alignment between components 303, 305, 307, the embodiment supports configurations in which the datagrams are not aligned and the number of datagrams for each component is different from that of the other components. For example, the number of datagrams for an audio component is typically less than the number of datagrams for a video component during a given time interval.

Figure 4:
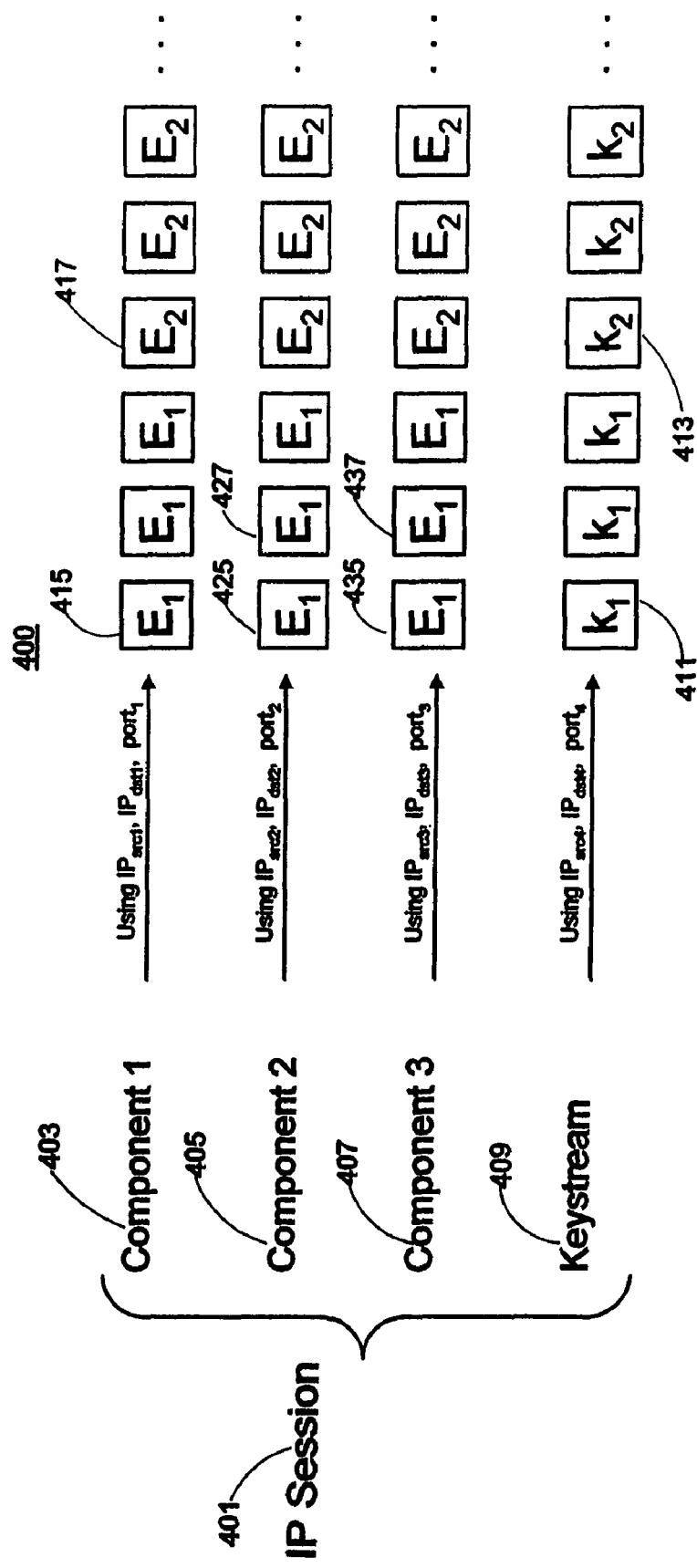
FIG. 4 shows a component configuration for a multi-media session shown according to an embodiment of the invention.

FIG. 4 shows a component configuration 400 for a multi-media session 401 according to an embodiment of the invention. Components 403, 405, and 407 are encrypted with the same key that changes periodically in keystream 409 during multi-media session 401. (In FIGS. 4-16, a datagram that is encrypted with key $k_i$ is denoted as $E_i$. (Keystream 409 is a logical channel that contains key information and that is separate from the media components.) Similarly, a datagram associated with the $j^{th}$ component and that is encrypted with the $i^{th}$ key associated with the $j^{th}$ component is denoted as $E_{ji}$.) The embodiment supports different encryption methods that are applied to component 403, 405, or 407, including:

IPSEC-ESP (so called IP-level encryption; see RFC on IPSEC-ESP)
    Payload of the application session packet encrypted (for example SRTP or DCF of OMA DRM 1.0 or 2.0)
    Encryption The above encryption methods may be applied separately or in combination during multi-media session 401. Components 403, 405, and 407 correspond to a different plurality of content datagrams. Keystream 409 includes a plurality of associated datagrams, each associated datagram corresponding to an encryption key. Encryption is typically performed on an individual datagram (e.g., packet) basis. For example, content datagrams 415, 425, 427, 435, and 437 are encrypted with key $k_1$ (corresponding to associated datagram 411) and content datagram 417 is encrypted with $k_2$ (corresponding to associated datagram 413).

Keystream 409 utilizes a delivery protocol such as RTP, ALC/FLUTE, UHTTP, DVBSTP, IP with a payload, and UDP with a payload. The keys delivered in keystream 409 are typically protected by another key that the entitled receiver has in order to access the contents of keystream 409 that carries keys, thus enabling access to the components 403, 405, and 407. The delivery of keystream 409 is optionally synchronized with components 403, 405, and 407, e.g., RTP timestamps with the use of RTP Control Protocol).

Figure 5:
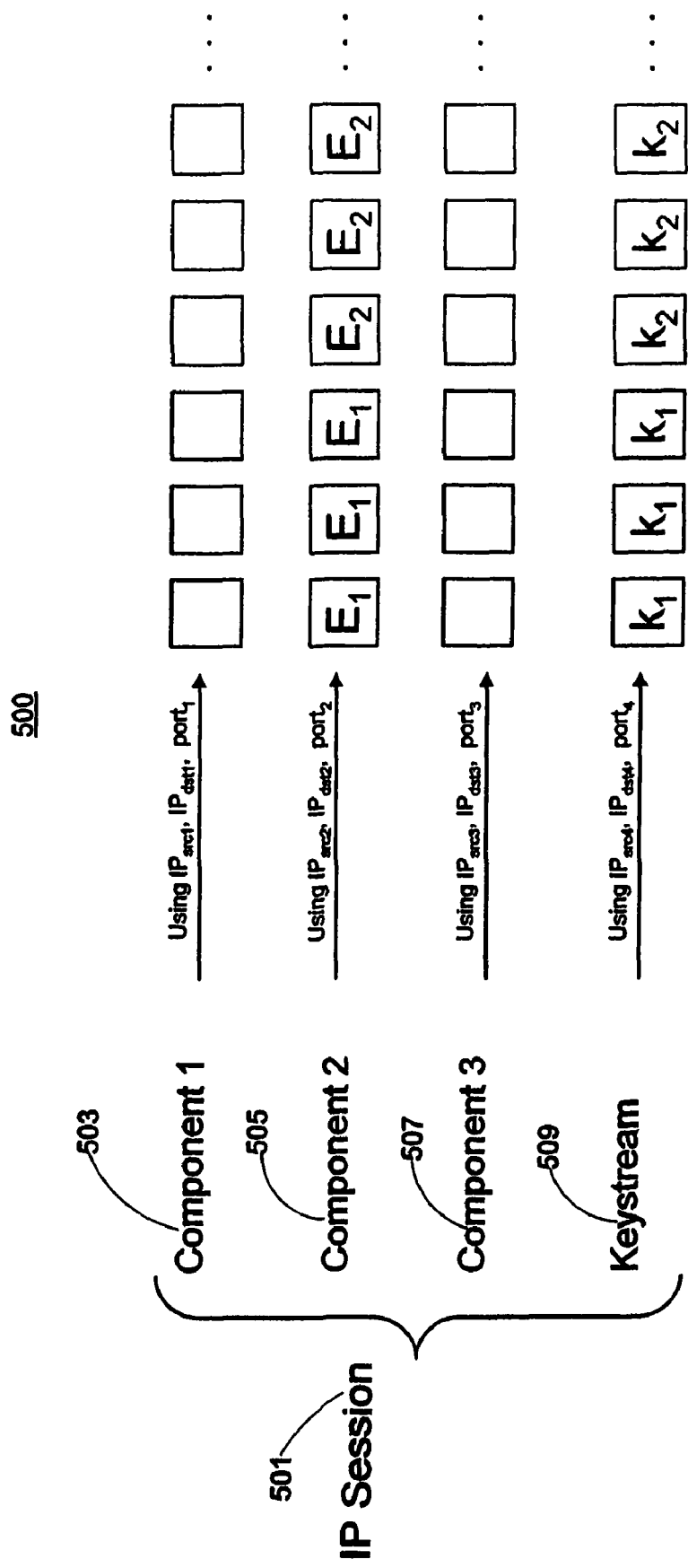
FIG. 5 shows a variation of the component configuration shown in FIG. 4 according to an embodiment of the invention.

FIG. 5 shows a variation of the component configuration shown in FIG. 4 according to an embodiment of the invention. Component configuration 500 is similar to component configuration 400. Multi-media session 501 includes components 503, 505, and 507 and keystream 509. Component 505 is encrypted with keys from keystream 509, while components 503 and 507 are not.

Figure 6:
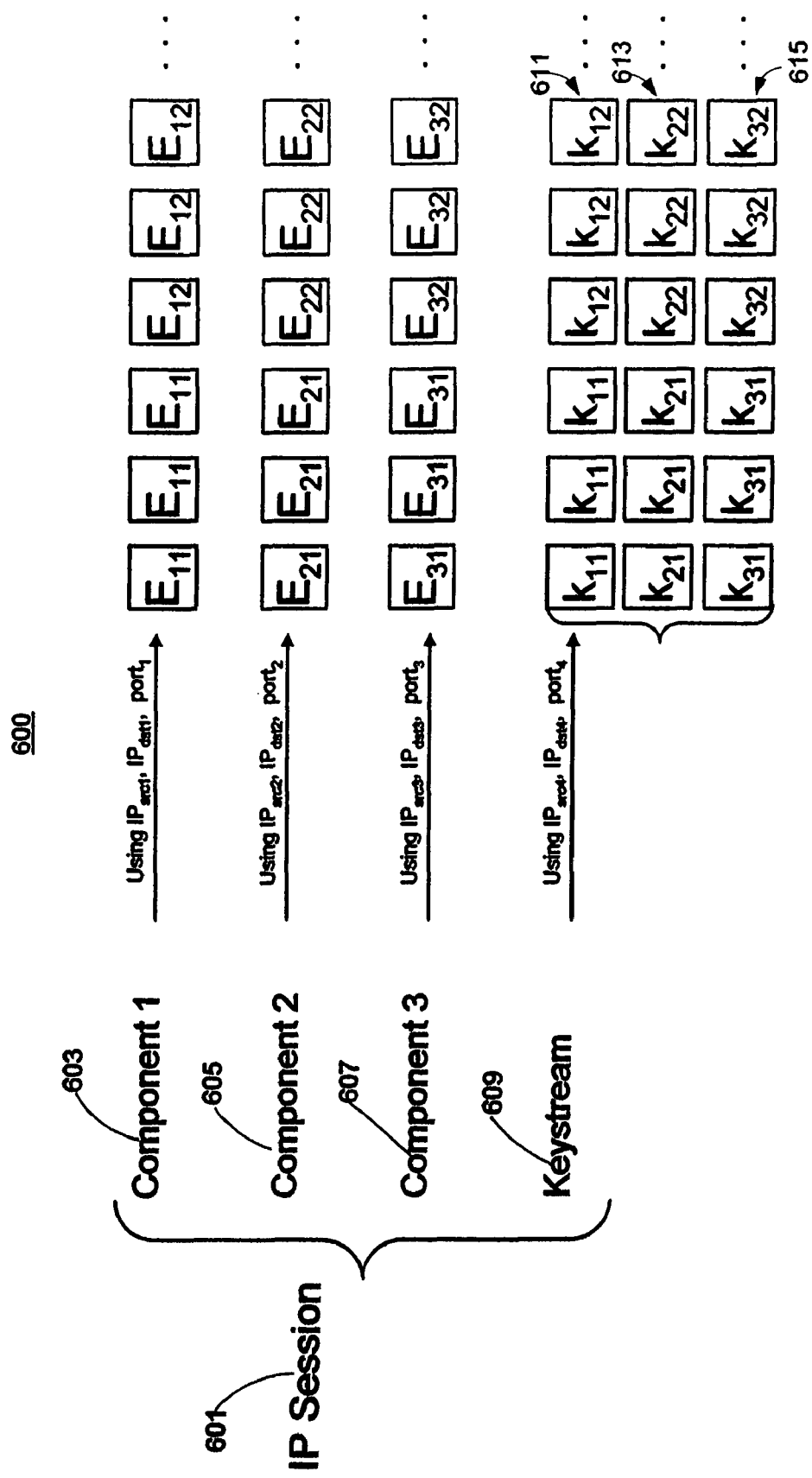
FIG. 6 shows a variation of the component configuration shown in FIG. 4 according to an embodiment of the invention.

FIG. 6 shows a variation of the component configuration shown in FIG. 4 according to an embodiment of the invention. Component configuration 600 is similar to component configuration 400. However, keystream 609 includes three series of keys 611, 613, and 615 that correspond to components 603, 605, and 607, respectively. The keys may change periodically but independently during multi-media session 601 but may be synchronized with each other.

Figure 7:
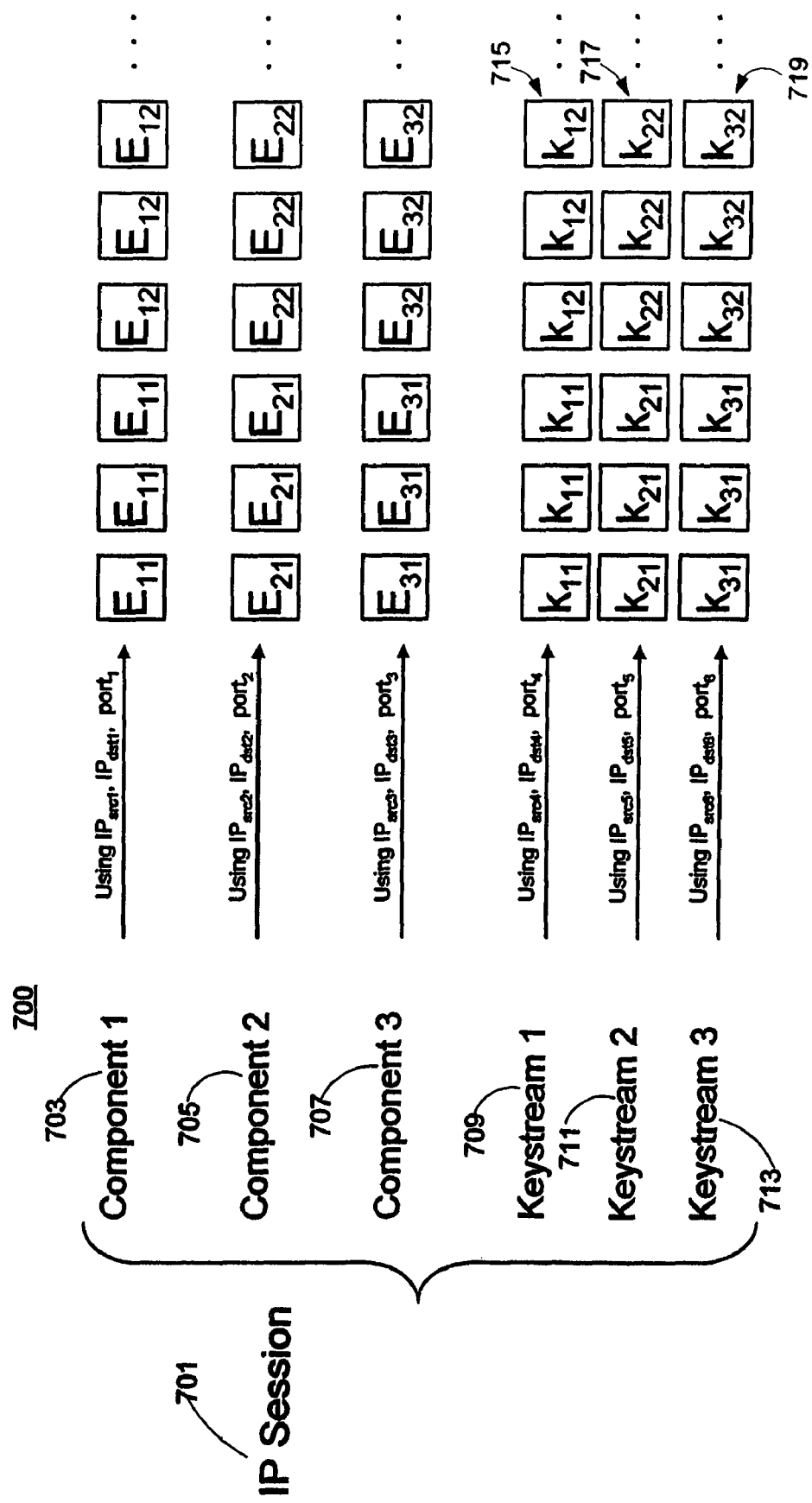
FIG. 7 shows a variation of the component configuration shown in FIG. 4 according to an embodiment of the invention.

FIG. 7 shows a variation of the component configuration shown in FIG. 4 according to an embodiment of the invention. Component configuration 700 is similar to component configuration 600 except that keys for each component are carried on different keystreams that change during multi-media session 701. Rather than having one keystream, component configuration 700 utilizes three keystreams 709, 711, and 713. Keystreams 709, 711, and 713 correspond to components 703, 705, and 707, respectively.

Figure 8:
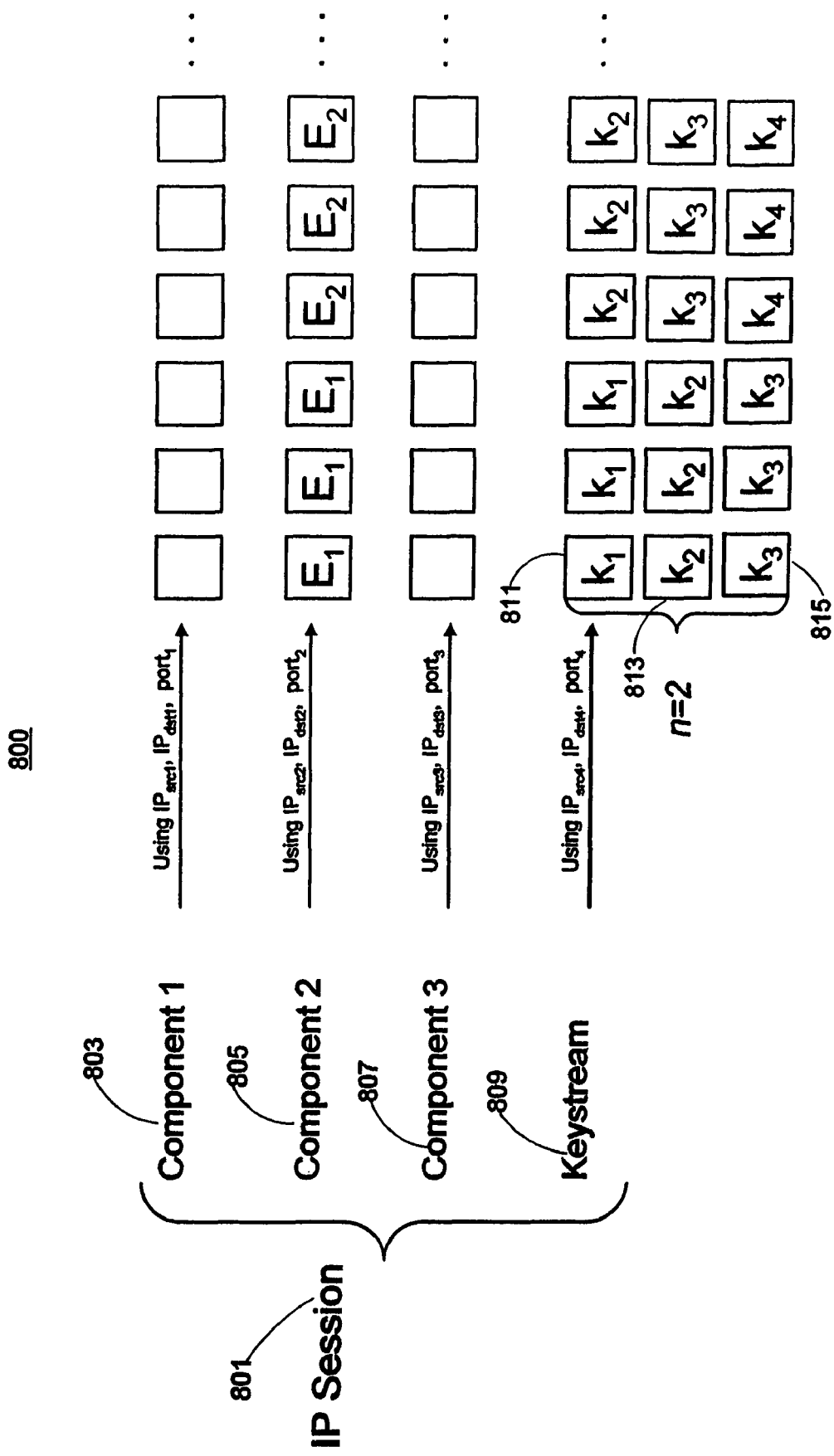
FIG. 8 shows a variation of the component configuration shown in FIG. 4 according to an embodiment of the invention.

FIG. 8 shows a variation of the component configuration shown in FIG. 4 according to an embodiment of the invention. With component configuration 800, component 805 is encrypted with keys from keystream 809. However, keystream 809 provides keys that are currently applicable to decrypting component 805 as well as keys that will be subsequently used in decrypting component 805. In the example shown in FIG. 8, key $k_1$ (corresponding to datagram 811) is currently applied while keys $k_2$ (corresponding to datagram 813) and $k_3$ (corresponding to datagram 815) are subsequently applied. While components 803 and 807 are not encrypted during multi-media session 801, components 803 and 807 may be encrypted with other variations of the embodiment. Having keys that will be subsequently applied enables a receiver device to smoothen key transitions during multi-media session 801. For example, the receiver device can configure the IP stack with a new key to reduce interruptions in decrypting content datagrams.

Figure 9:
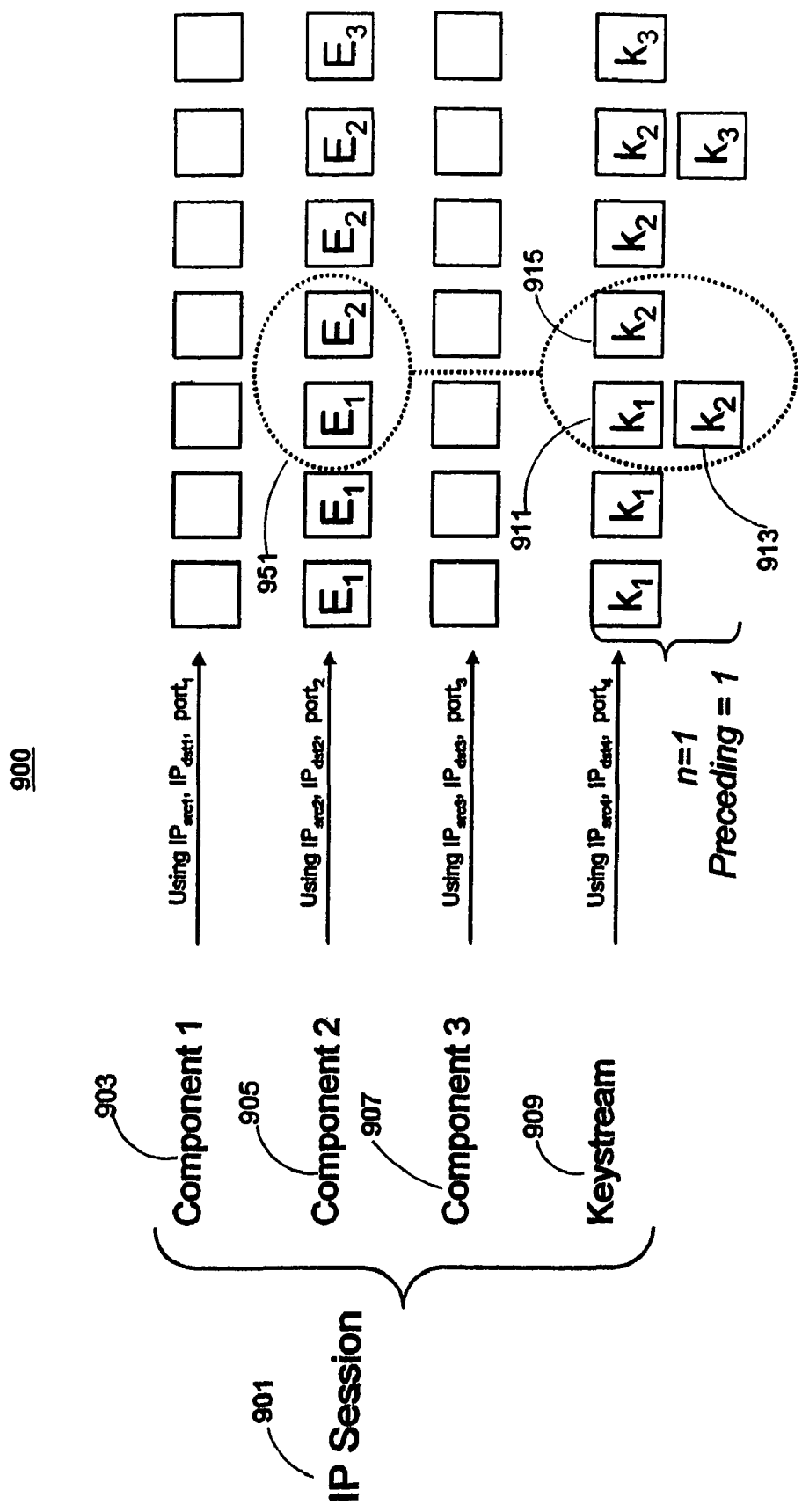
FIG. 9 shows a variation of the component configuration shown in FIG. 4 according to an embodiment of the invention.

FIG. 9 shows a variation of the component configuration shown in FIG. 4 according to an embodiment of the invention. Keystream 909 includes the key currently being applied to component 905 for encryption as well as keys that will be subsequently applied when the key transition is within a predetermined incremental time of the current time. For example, before key transition 951, keystream 909 includes both keys $k_1$ (corresponding to datagram 911) and $k_2$ (corresponding to datagram 913) and includes only $k_2$ (corresponding to datagram 915) after the key transition 951. As with component configuration 800, component configuration 900 assists the receiver device to smoothen the effects of key transitions.

Figure 10:
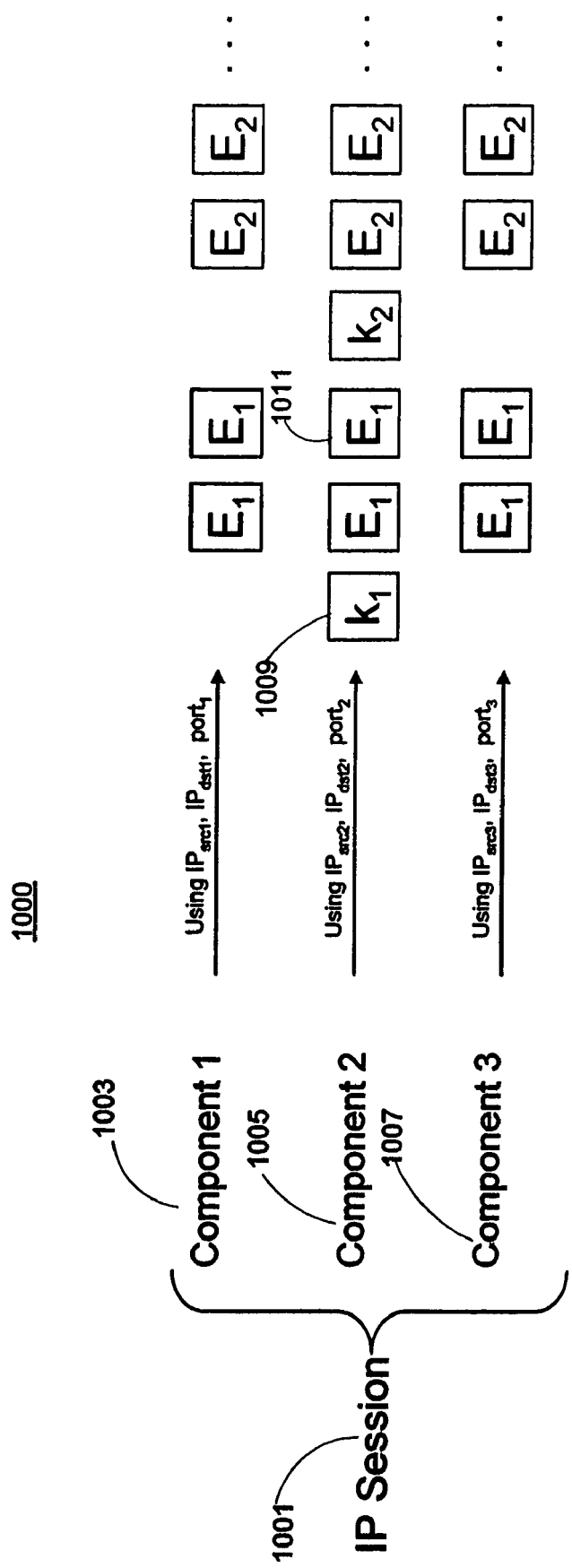
FIG. 10 shows a component configuration for a multi-media session according to an embodiment of the invention.

FIG. 10 shows a component configuration 1000 for a multi-media session 1001 according to an embodiment of the invention. However, in comparison with component configurations 400-900, keys are carried in one or more of the components rather than having a separate keystream for transmitting the keys. With component configuration 100, component 1005 includes content datagrams (e.g., content datagram 1011) as well as datagram 1009 that provides key $k_i$ that has been used for encrypting components 1003, 1005, and 1007.

Figure 11:
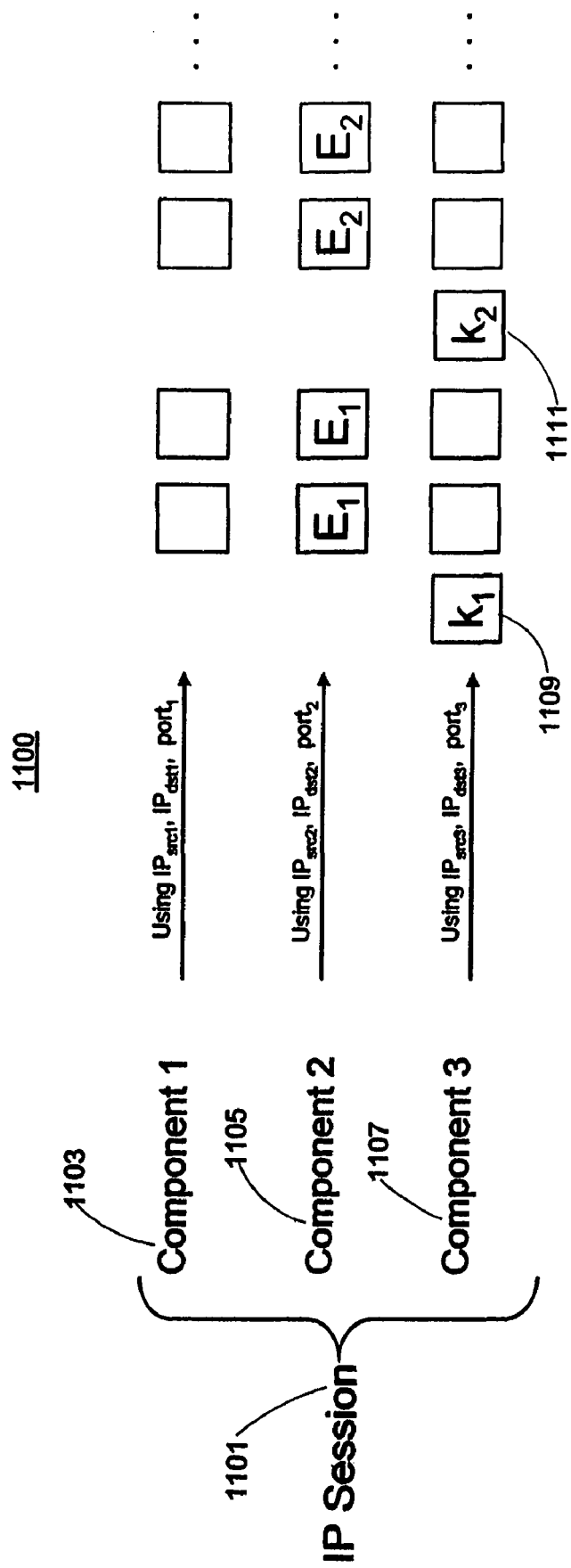
FIG. 11 shows a variation of the component configuration shown in FIG. 10 according to an embodiment of the invention.

FIG. 11 shows a variation of the component configuration shown in FIG. 10 according to an embodiment of the invention. With component configuration 1100, component 1107 provides key $k_1$ (corresponding to datagram 1109) and key $k_2$ (corresponding to datagram 1111) that are applied to component 1105 during multi-media session 1101. In the example shown in FIG. 11, components 1103 and 1107 are not encrypted with the keys provided by component 1107.

Figure 12:
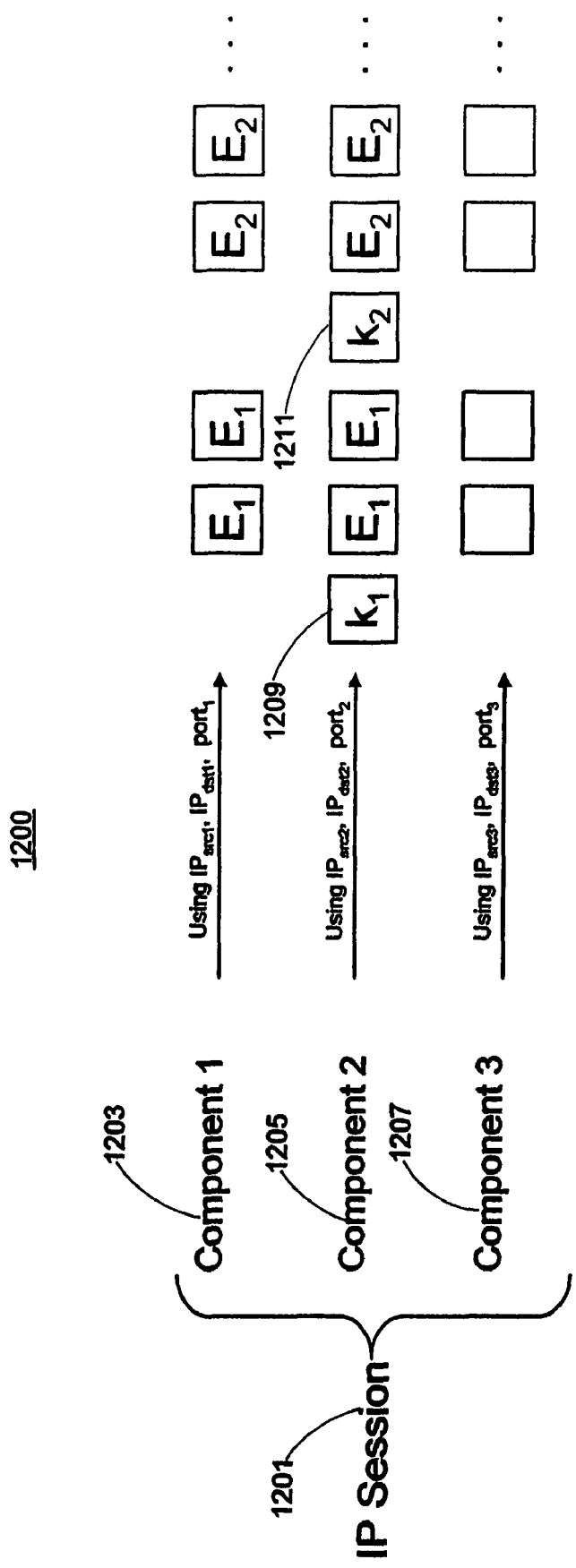
FIG. 12 shows a variation of the component configuration shown in FIG. 10 according to an embodiment of the invention.

FIG. 12 shows a variation of the component configuration shown in FIG. 10 according to an embodiment of the invention. Component configuration 1200 is similar to component configuration 1100. However, keys are applied to both the component carrying key information (component 1205) as well another component (component 1203) during multi-media session 1201. However, in the example shown in FIG. 12, component 1207 is not encrypted.

Figure 13:
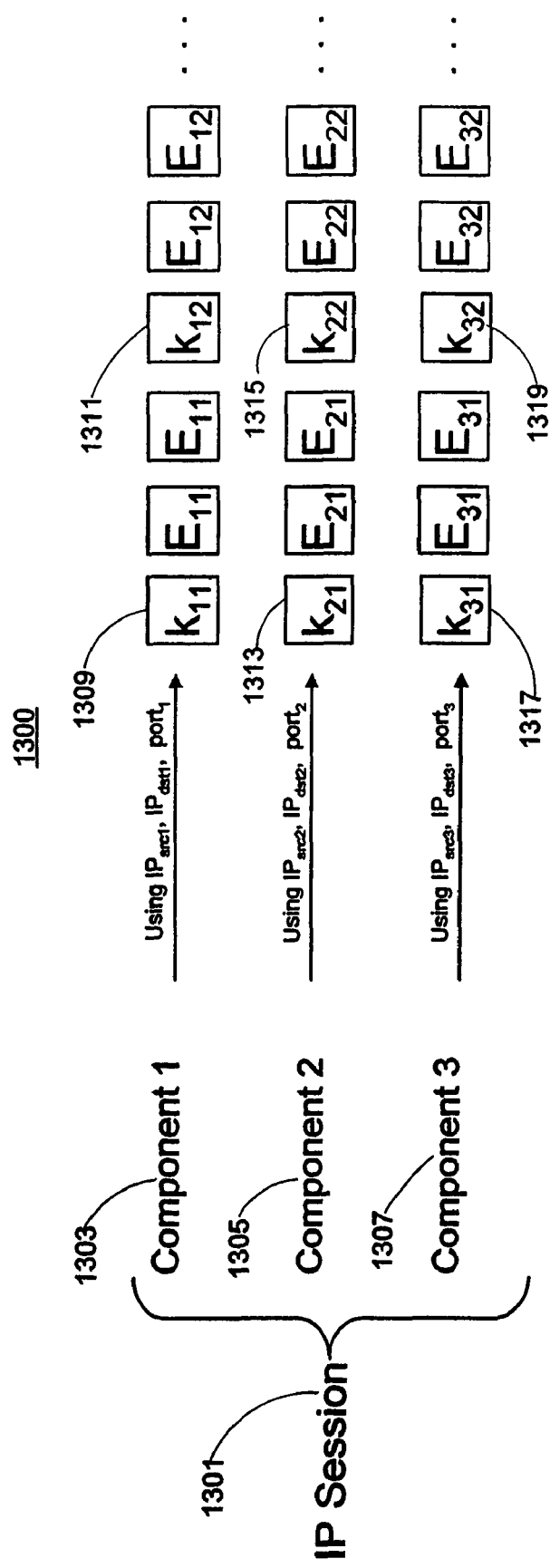
FIG. 13 shows a variation of the component configuration shown in FIG. 10 according to an embodiment of the invention.

FIG. 13 shows a variation of the component configuration shown in FIG. 10 according to an embodiment of the invention. With component configuration 1300, each component 1303, 1305, and 1307 carries keys that are applied to the same component during multi-media session 1301. For example, keys $k_{11}$ (corresponding to datagram 1309) and $k_{12}$ (corresponding to datagram 1311) are applied to component 1303. Keys $k_{21}$ (corresponding to datagram 1313) and $k_{22}$ (corresponding to datagram 1315) are applied to component 1305. Keys $k_{31}$ (corresponding to datagram 1317) and $k_{32}$ (corresponding to datagram 1319) are applied to component 1307.

Figure 14:
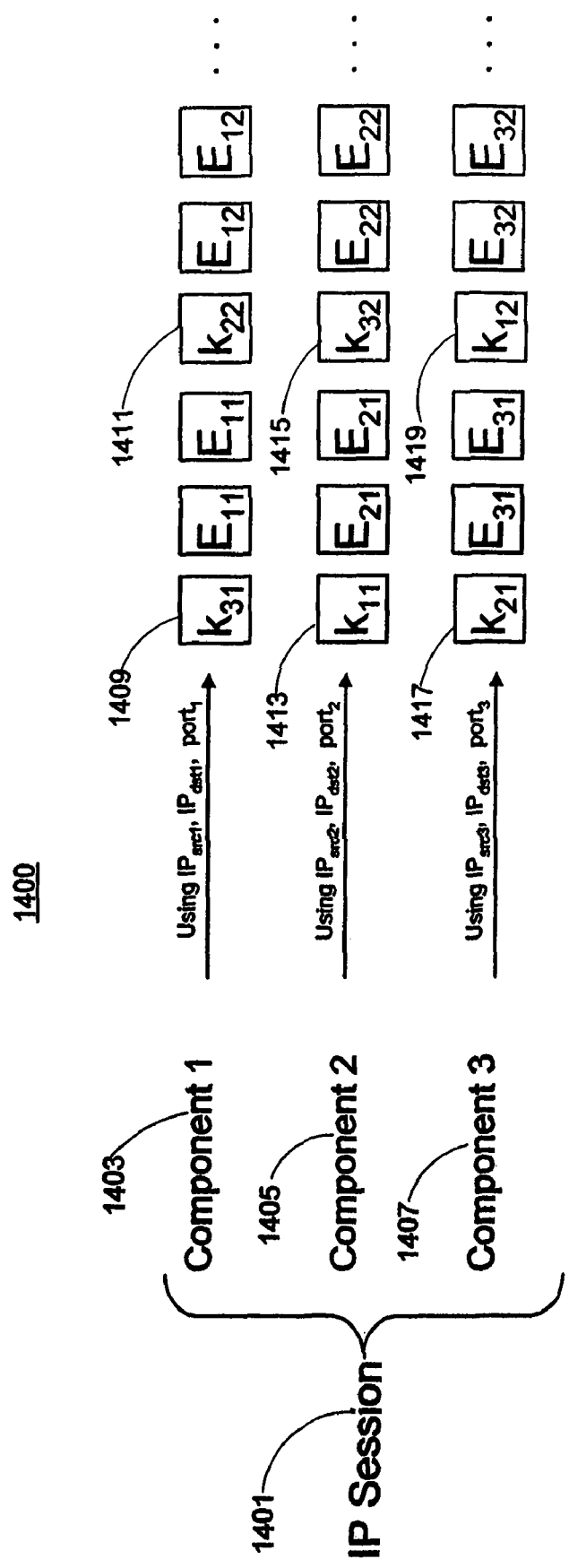
FIG. 14 shows a variation of the component configuration shown in FIG. 10 according to an embodiment of the invention.

FIG. 14 shows a variation of the component configuration shown in FIG. 10 according to an embodiment of the invention. With component configuration 1400, each component 1403, 1405, and 1407 carries keys that are applied to a different component during multi-media session 1401. For example, keys $k_{11}$ (corresponding to datagram 1413 and carried by component 1405) and $k_{12}$ (corresponding to datagram 1419 and carried by component 1407) are applied to component 1403. Keys $k_{21}$ (corresponding to datagram 1417 and carried by component 1407) and $k_{22}$ (corresponding to datagram 1411 and carried by component 1403) are applied to component 1405. Keys $k_{31}$ (corresponding to datagram 1409 and carried by component 1403) and $k_{32}$ (corresponding to datagram 1415 and carried by component 1405) are applied to component 1407.

Figure 15:
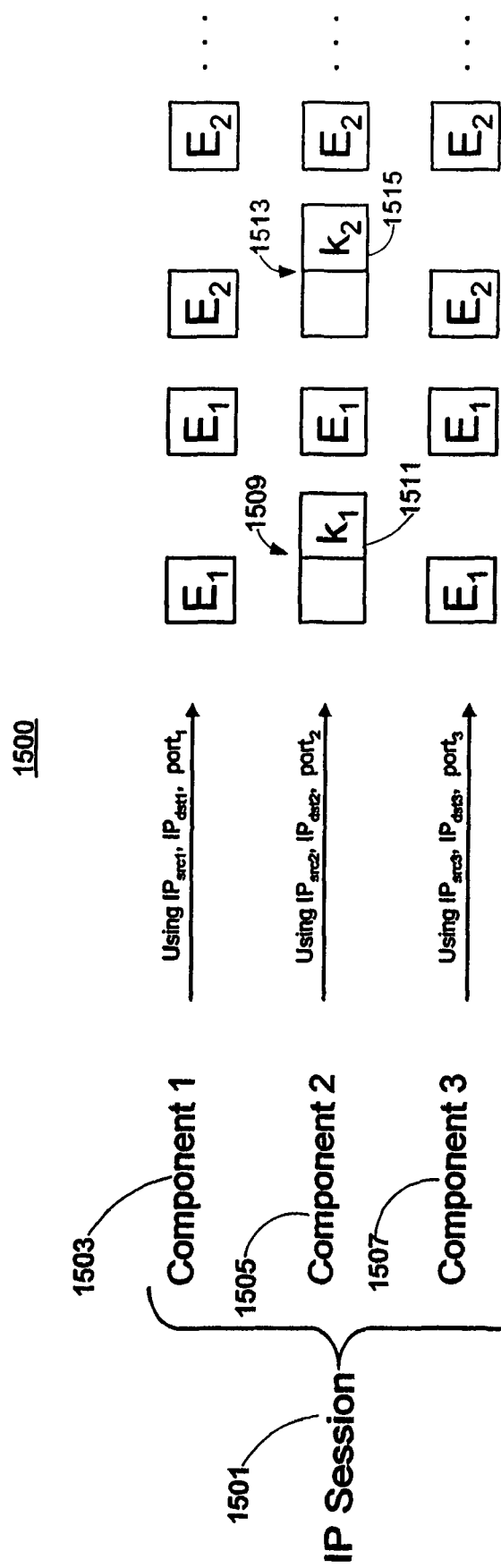
FIG. 15 shows a variation of the component configuration shown in FIG. 10 according to an embodiment of the invention.

FIG. 15 shows a variation of the component configuration shown in FIG. 10 according to an embodiment of the invention. With component configuration 1500, key information is carried in a content datagram rather than in a separate datagram. For example, key $k_1$ is included in content datagram 1509 within a concatenated portion (or with a special header) 1511 and $k_2$ is included in content datagram 1513 within a concatenated portion (or with a special header) 1515. Keys $k_1$ and $k_2$ are applied to datagrams in components 1503, 1505, and 1507.

Figure 16:
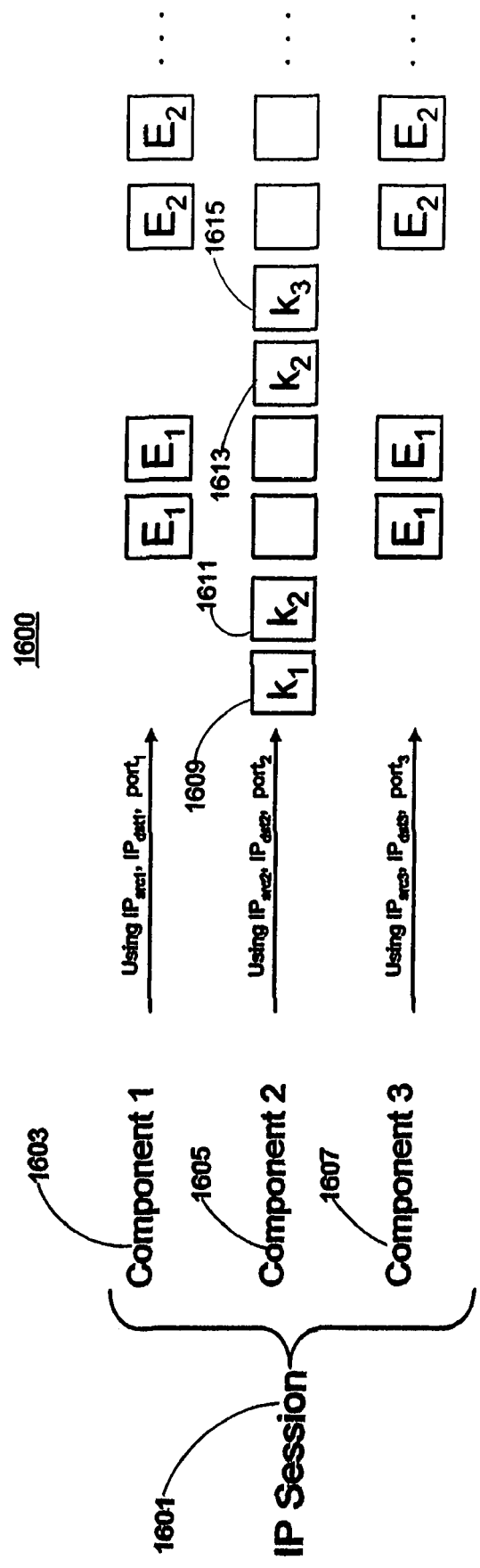
FIG. 16 shows a variation of the component configuration shown in FIG. 10 according to an embodiment of the invention.

FIG. 16 shows a variation of the component configuration shown in FIG. 10 according to an embodiment of the invention. Component configuration 1600 is similar to component configuration 800, in which both the current key as well as subsequent keys are provided. For example, component 1605 carries key $k_1$ (corresponding to datagram 1609) and key $k_2$ (corresponding to datagram 1611), where key $k_1$ is currently applied to components 1603 and 1607 and key $k_2$ is subsequently applied during multi-media session 1601. Similarly, key $k_2$ (corresponding to datagram 1613) and key $k_3$ (corresponding to datagram 1615) are subsequently carried in component 1605. As with component configuration 800, component configuration 1600 assists the receiver device to smoothen key transitions.

Figure 17:
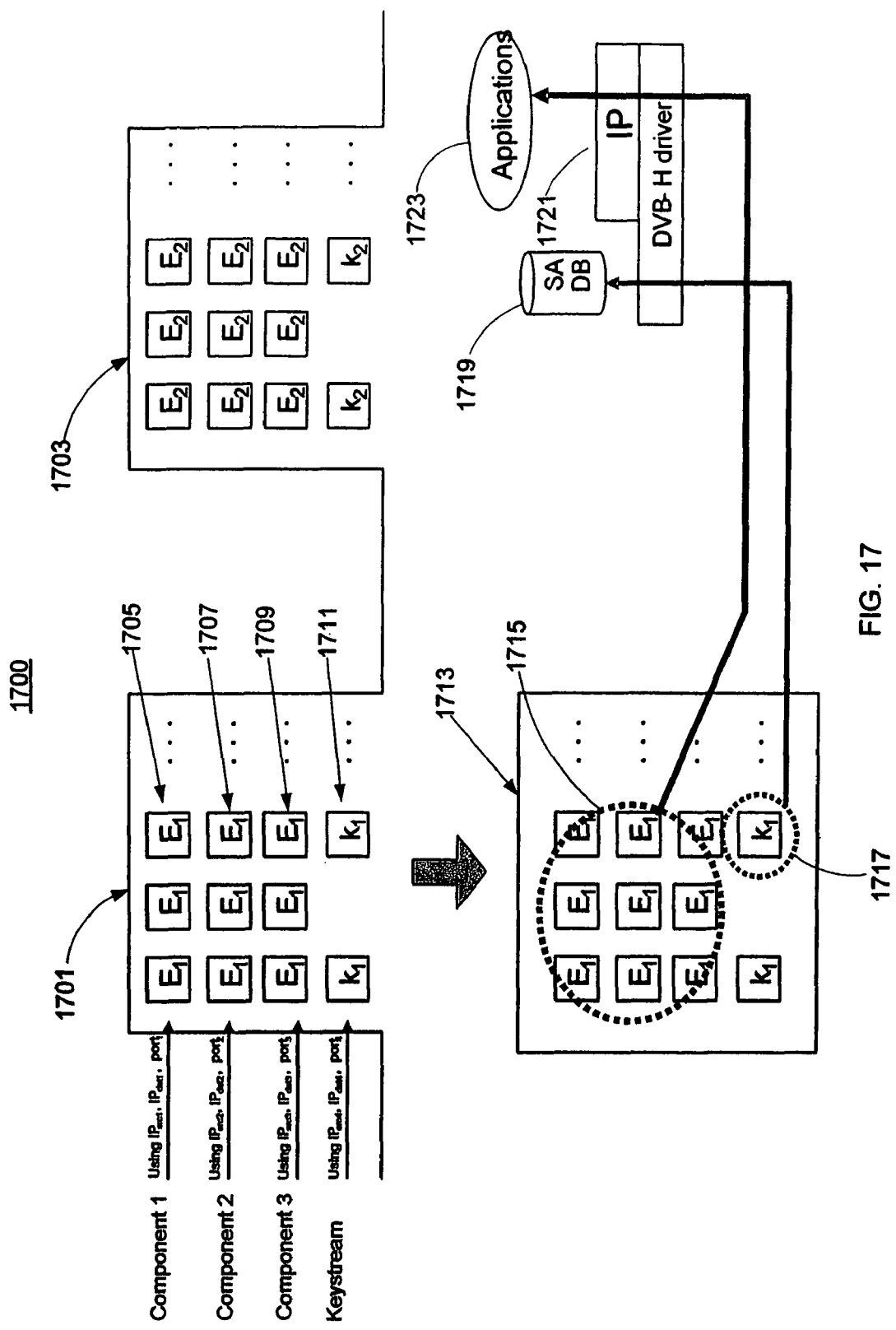
FIG. 17 shows a procedure for receiving a multi-media session in accordance with an embodiment of the invention.

FIG. 17 shows an architecture 1700 for receiving a multi-media session in accordance with an embodiment of the invention. With architecture 1700, a receiving device receives time slice burst of data 1701 containing both the IP session components and the keystream related to the session components. Pluralities of content datagrams 1705, 1707, and 1709 correspond to component 1, component 2, and component 3, respectively. A plurality of datagrams 1711 corresponds to the keystream. Time slice burst 1701 is stored in interim buffer 1713 before forwarding the datagrams (packets) to IP stack 1721. The receiving device first extracts the keys (corresponding to datagram 1717) for the received time slice burst 1701 from interim buffer 1713. Second, the receiving device installs the extracted keys to IPSec Security Association (SA) database 1719. Also, the receiving device extracts remaining datagrams 1715 from the interim buffer and forwards them to IP stack 1721. After decryption, the processed datagrams are passed to applications 1723 for the presentation of the multi-media content. Consequently, IP stack 1721 does not reject the content datagrams (unless there are content datagrams that the receiving device did not have a corresponding key as delivered in the current time slice or a previous time slice burst). The process is repeated for a next received time slice burst 1703.

Figure 18:
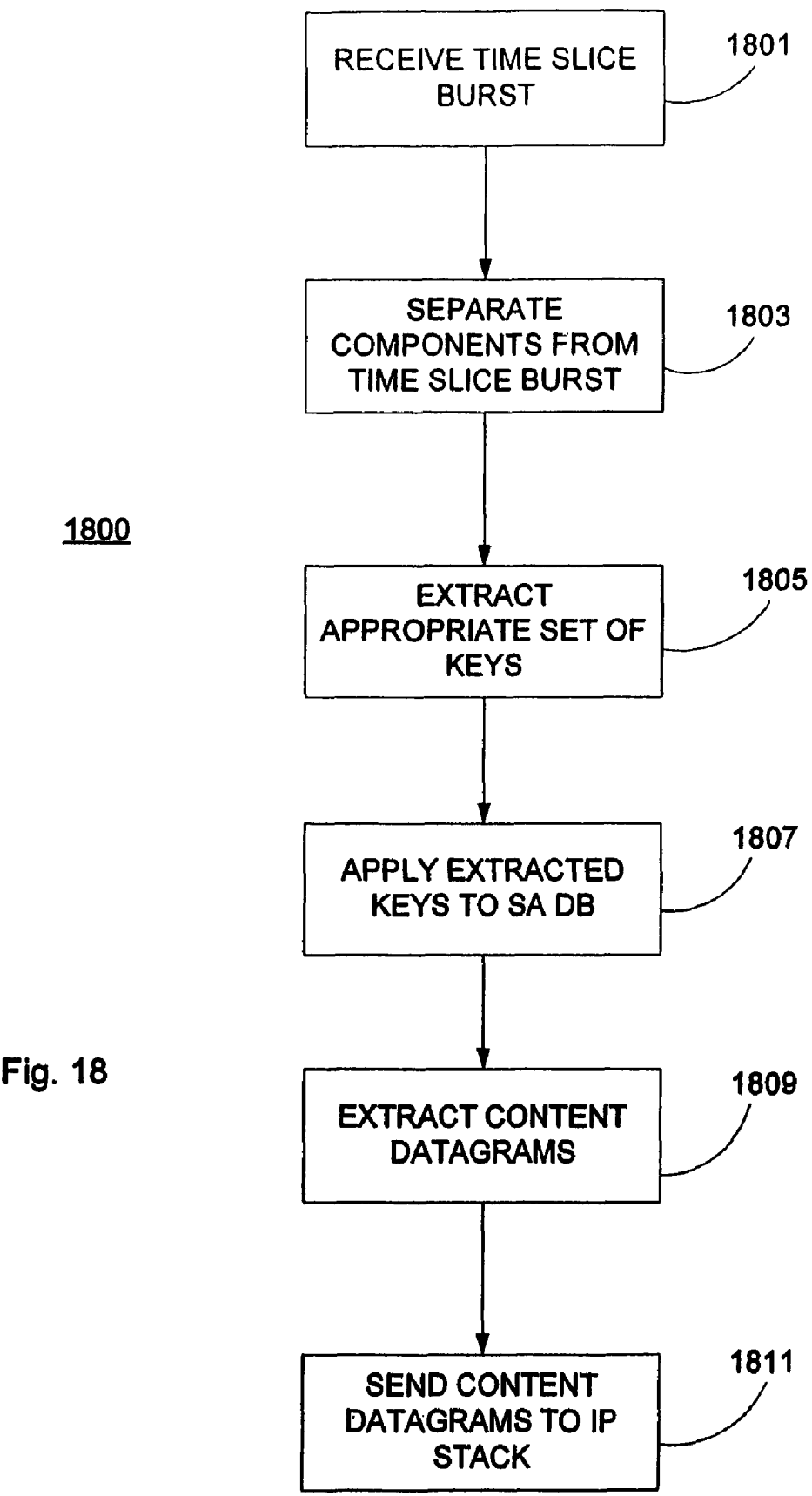
FIG. 18 shows a flow diagram for the architecture shown in FIG. 17 in accordance with an embodiment of the invention.

FIG. 18 shows flow diagram 1800 for the architecture shown in FIG. 17 in accordance with an embodiment of the invention. In step 1801, a receiving device receives a time slice burst over a communications channel, e.g., a wireless channel. In step 1803, the receiving device separates components (e.g., an audio component and a video component) from the received time slice burst. In step 1805, the receiving device extracts the associated set of keys from the keystream. The extracted keys may be applied to content datagrams contained in the time slice burst or in subsequent time slice bursts. Also, the embodiment supports configurations in which different keys are used for different datagrams in the time slice burst. The extracted keys are applied to an IPSec Security Association (SA) database (e.g., SA DB 1719 shown in FIG. 17) in step 1807. In step 1809, the content datagrams are extracted from a buffer (e.g., interim buffer 1713) and sent to an IP stack (e.g., stack 1721) in step 1811. The content datagrams are subsequently decrypted and sent to the corresponding application.

Figure 19:
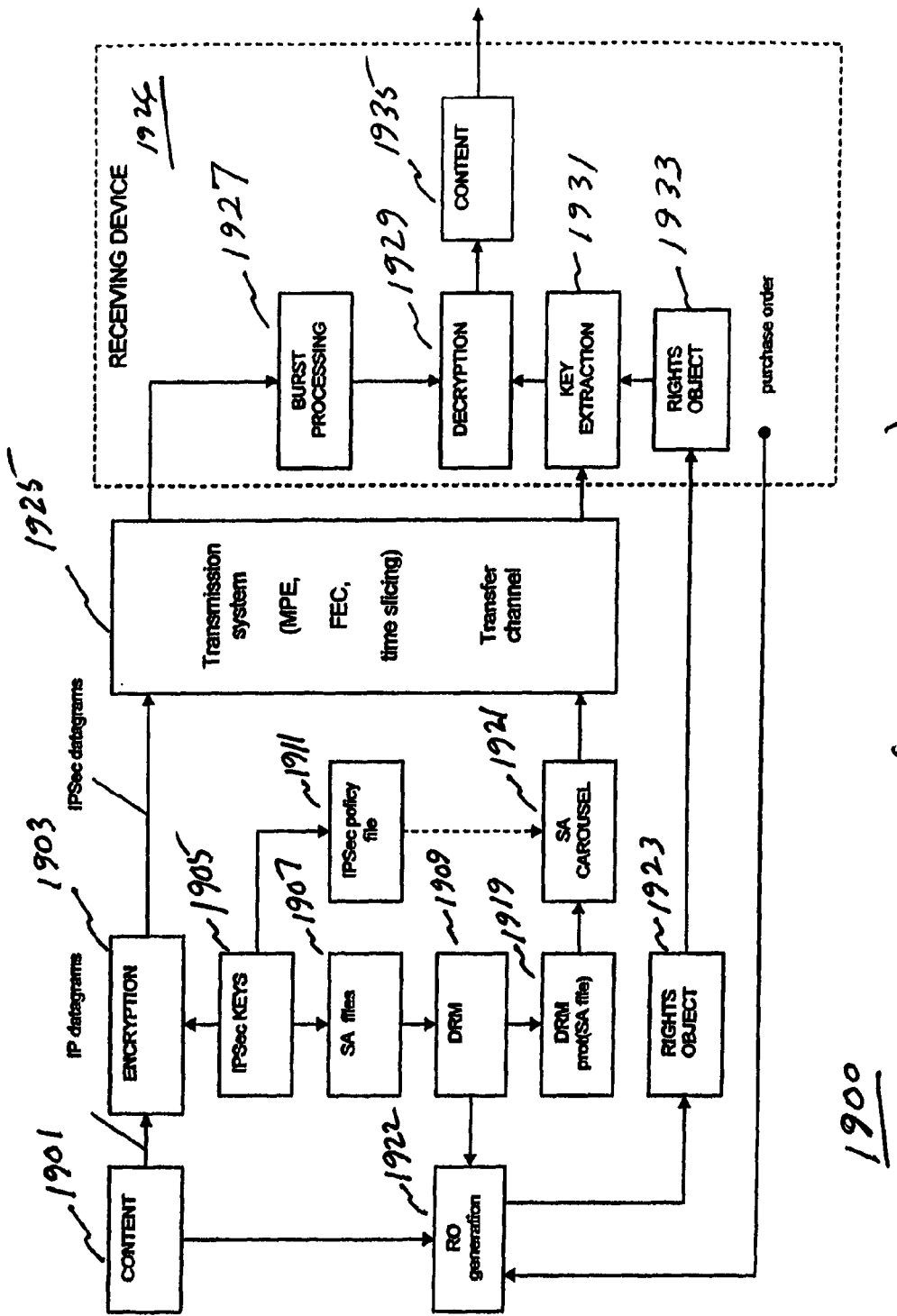
FIG. 19 shows a system for protected content transfer that supports DVB-H IPDC (IP datacast) services according to prior art.

FIG. 19 shows a system 1900 for protected content transfer that supports DVB-H IPDC (IP datacast) services according to prior art. System 1900 provides protected content transfer for DVB-H services using IPDC as specified in "Interim DVB-H IP Datacast Specifications: IP Datacast Baseline Specification: Specification of Interface I_MT", DVB Document A080, April 2004. In accordance with this specification, portions of security associated data are transmitted in an electronic service directory (ESG) in SA carousel 1921 as DRM protected SA file 1919 (which is provided by digital rights manager (DRM) 1909 by performing the protection function) and IPSec policy file 1911. As the carousel data is typically updated infrequently (e.g., once a day) system 1900 does not provide an efficient solution for key delivery, especially if one or more of the keys is updated or frequently changes.

Multi-media content 1901 (corresponding to IP datagrams) is encrypted by encryption module 1903 with IPSec keys 1905 and transmitted (as performed by transmission system 1925) as time slice packets (after multi-protocol encapsulation, FEC encoding, and time slice burst formation) to receiving device 1926. Rights object (RO) 1923 (which is provided by rights object generation 1922) is transmitted to receiving device 1926 through an interaction channel, in which receiving device 1926 is provided with a means for bidirectional communications, e.g., mobile phone functionality. A user of receiving device 1926 may order service (content) and consequently receive the corresponding rights object (RO) 1933, which allows the user to decrypt the content of the ordered service. In the embodiment, rights object 1933 typically does not contain IPSec keys 1905.

Receiving device 1926 processes time slice bursts with burst processing module 1927. Received packets are decrypted by decryption module 1929 with a key provided by key extraction module 1931 in order to obtain content 1935. The keys are determined from rights object 1933. The keys are typically delivered in a SA carousel as DRM protected SA files. Rights object 1933 allows receiving device 1926 to extract the keys.

Figure 20:
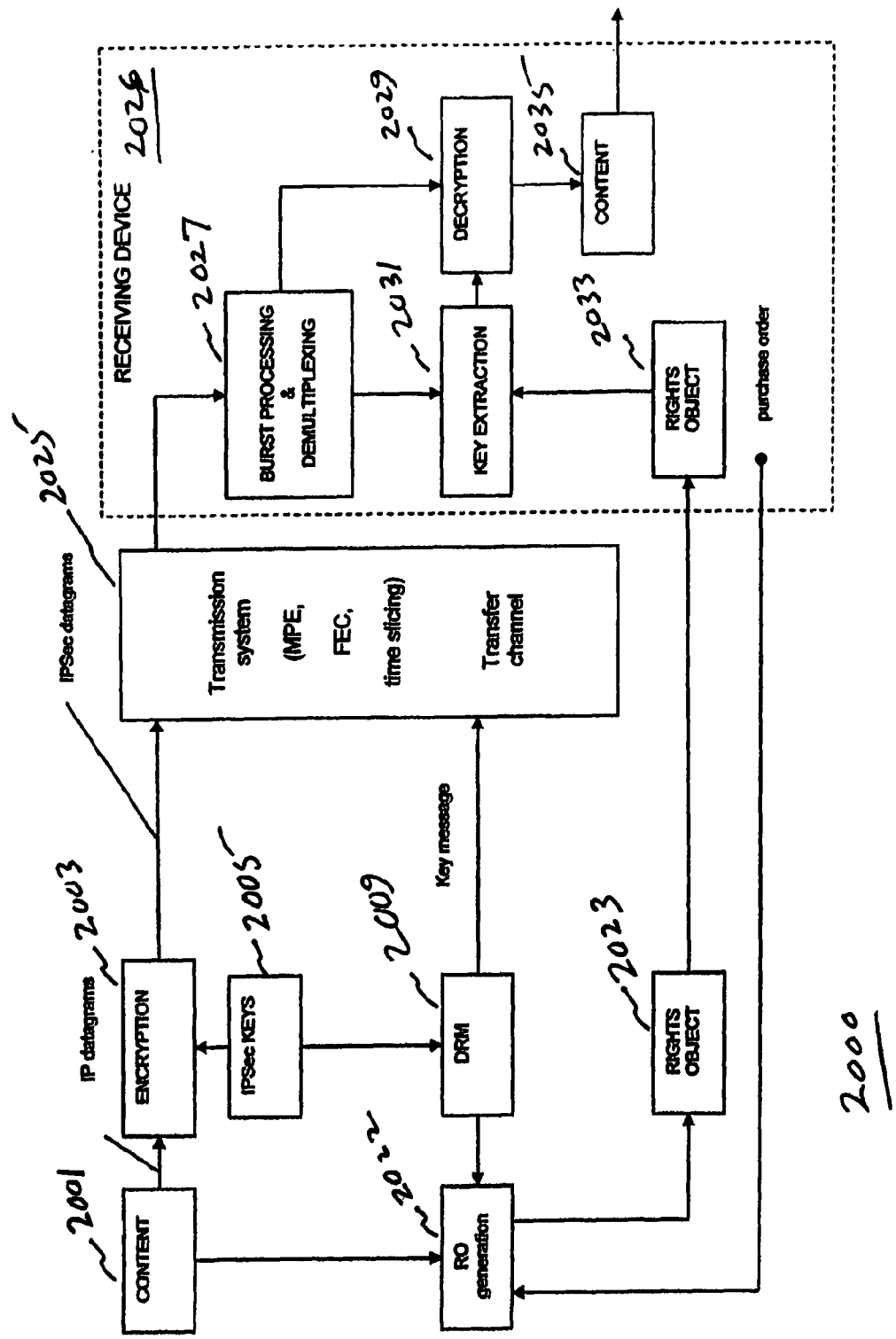
FIG. 20 shows a system that supports DVB-H IPDC services in accordance with an embodiment of the invention.

FIG. 20 shows a system 2000 that supports DVB-H IPDC services in accordance with an embodiment of the invention. Multi-media content 2001 (corresponding to content datagrams) is encrypted by encryption module 2003 by applying IPSec keys 2005. Transmission system 2025 obtains both encrypted content datagrams from encryption module 2003 and the corresponding keys from DRM 2009. Transmission system 2025 forms corresponding datagrams that contain the keys corresponding to encrypting the content datagrams. Transmission system 2025 inserts both the encrypted content datagrams and the corresponding datagrams into a time slice burst, which is transmitted to receiving device 2026 over a communications channel. While FIG. 20 does not explicitly show a radio module, the embodiment may provide wireless signal capability in order to transmit the time slice burst to receiving device 2026 over a wireless channel.

Receiving device 2026 processes a received time slice burst, in which the encrypted content datagrams and corresponding datagrams (containing the corresponding keys that are used for encrypting the received content datagrams) are separated (demultiplexed) by burst processing module 2027. In the embodiment, receiving device 2026 comprises a broadband receiver for receiving DVB signals that include time slice bursts and a transceiver for bidirectional communications in a wireless network. The bidirectional communications supports service ordering by a user, OMA messaging, and security plug-in module installation. The embodiment supports different signal configurations, in which the keys are included in a separate keystream or in which keys are included in multi-media components as previously discussed with FIGS. 4-16. Key extraction module 2031 extracts the keys from the corresponding datagrams in order to decrypt the content datagrams, as performed by decryption module 2029. Decryption module provides decrypted content 2035 to an application (not shown) so that the content can be presented.

Additionally, rights management object 2023 (as determined by rights object generator 2022) is separately transmitted to receiving device 2026 in response to a purchase order. Consequently, receiving device 2026 receives rights object 2033 to determine if receiving device 2026 is permitted to process the received content.

Figure 21:
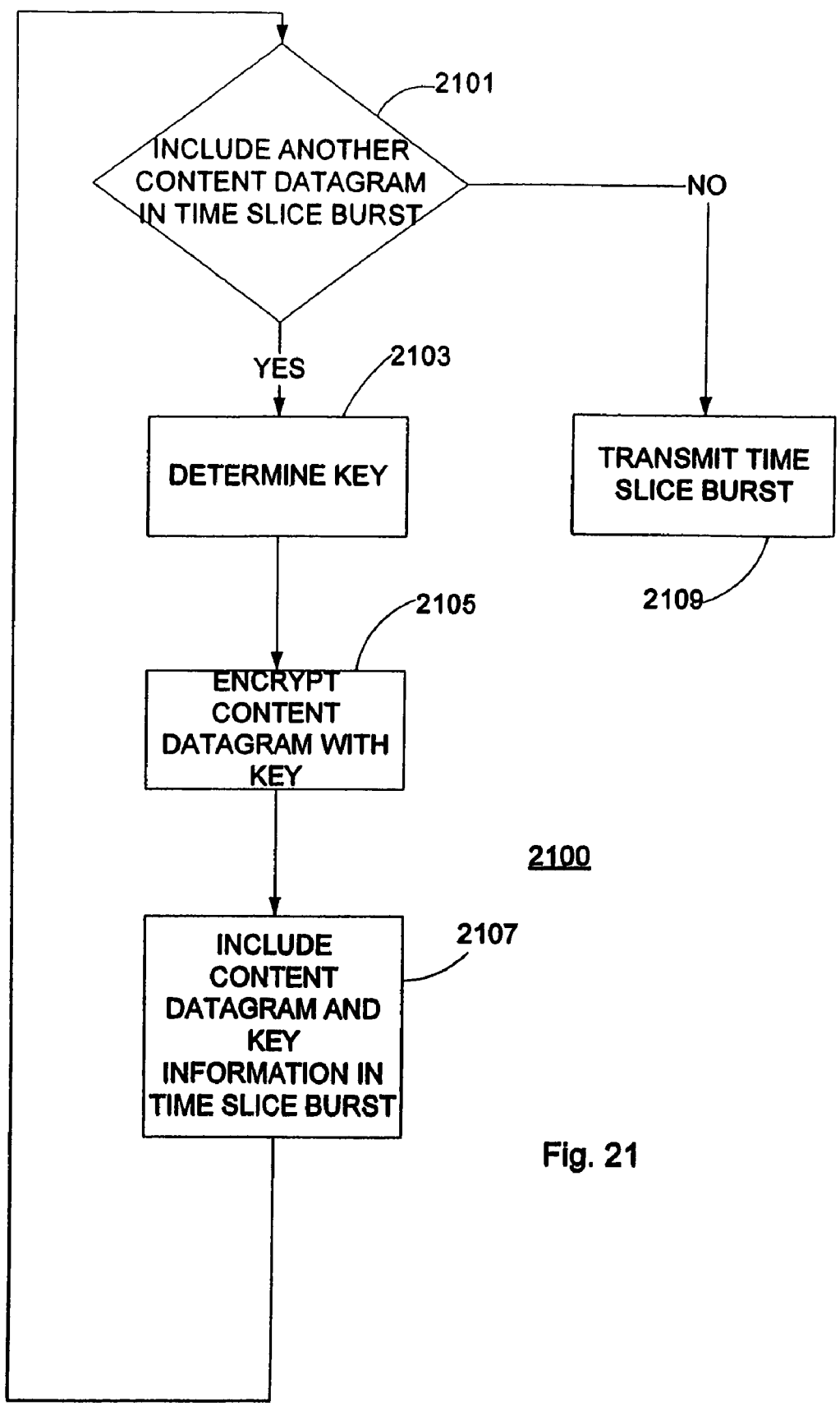
FIG. 21 show a flow diagram for transmitting data for DVB-H IPDC services in the system shown in FIG. 20 in accordance with an embodiment of the invention.

FIG. 21 show a flow diagram 2100 for transmitting data for DVB-H IPDC services in system 2000 in accordance with an embodiment of the invention. In step 2101, transmitting apparatus (e.g., transmission system 2025) determines if an obtained content datagram should be included in the current time slice burst. If not, the time slice burst (with previously obtained content datagrams and associated keys) is sent to the receiving device in step 2109.

If the obtained content datagram should be included in the current time slice burst, step 2103 determines the corresponding key and encrypts the content datagram with the key in step 2105. In step 2107 the encrypted content datagram and the corresponding key information (corresponding to a corresponding datagram that may be included in multi-media component or in a keystream) is inserted in the current time slice burst.

Figure 22:
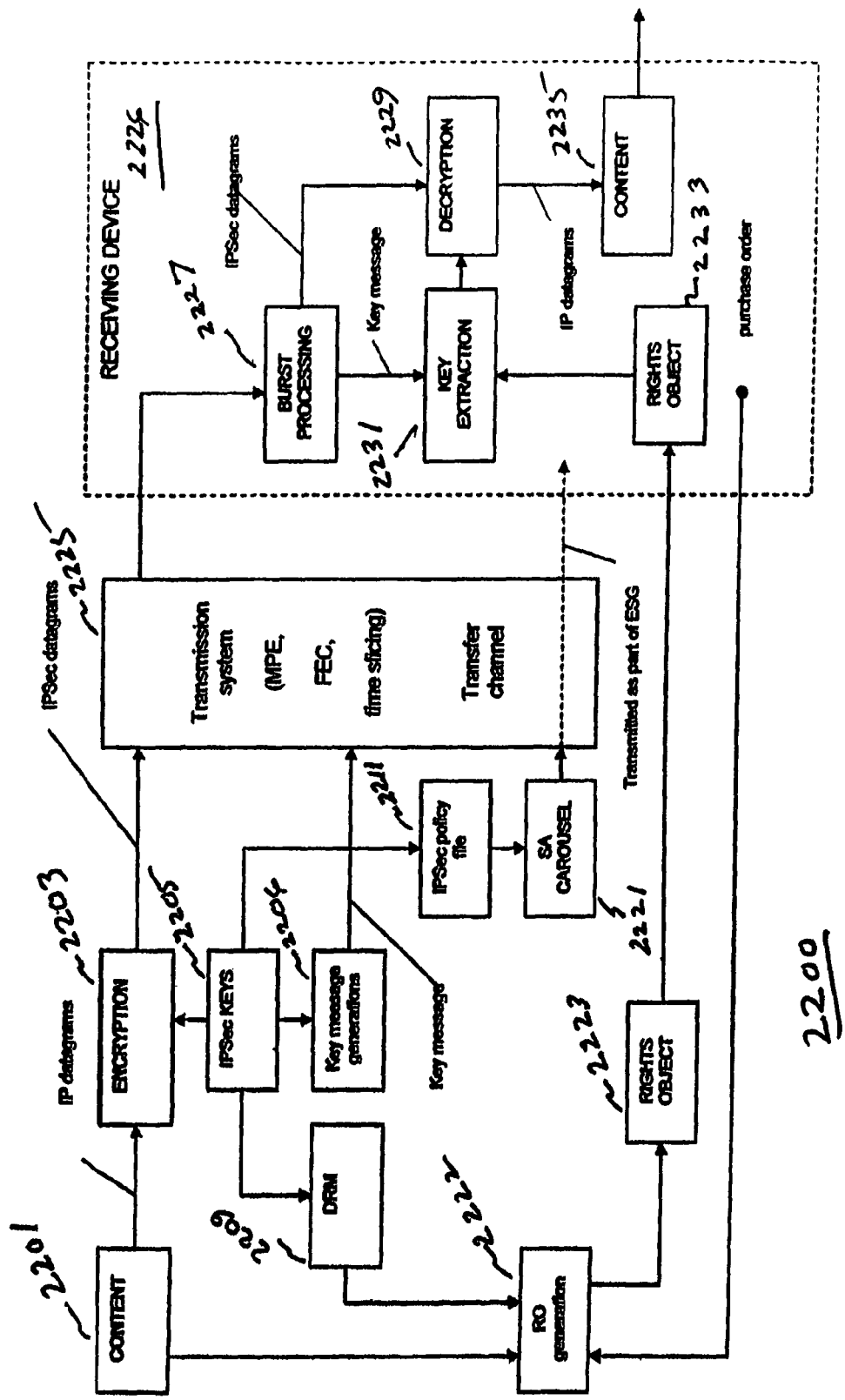
FIG. 22 shows a system that supports DVB-H IPDC services in accordance with an embodiment of the invention.

FIG. 22 shows a system 2200 that supports DVB-H IPDC services in accordance with an embodiment of the invention. In FIG. 22, elements 2201, 2203, 2205, 2222, 2223, 2227, 2229, 2231, 2233, and 2235 correspond to elements 2001, 2003, 2005, 2022, 2023, 2027, 2029, 2031, 2033, and 2035 as shown in FIG. 20. As with system 2000, system 2200 transmits content datagrams and corresponding key information in the same time slice burst. Key information is provided to transmission system 2225 by key message generator 2206. Key message generator may further encrypt the keys so that encrypted key information is transmitted to receiving device 2226 by transmission system 2225. DRM 2209, in conjunction with rights object generator 2222, provides rights object 2233 that corresponds to the desired DVB-H IPDC service to receiving device 2226.

IPSec policy files 2211 (that may contain security association information) are separately transmitted in SA carousel 2221 from the service (content) and key messages that are multiplexed and transmitted using IPDC time slicing. In the embodiment, SA carousel 2221 is transmitted as part of the electronic service guide (ESG).

Figure 23:
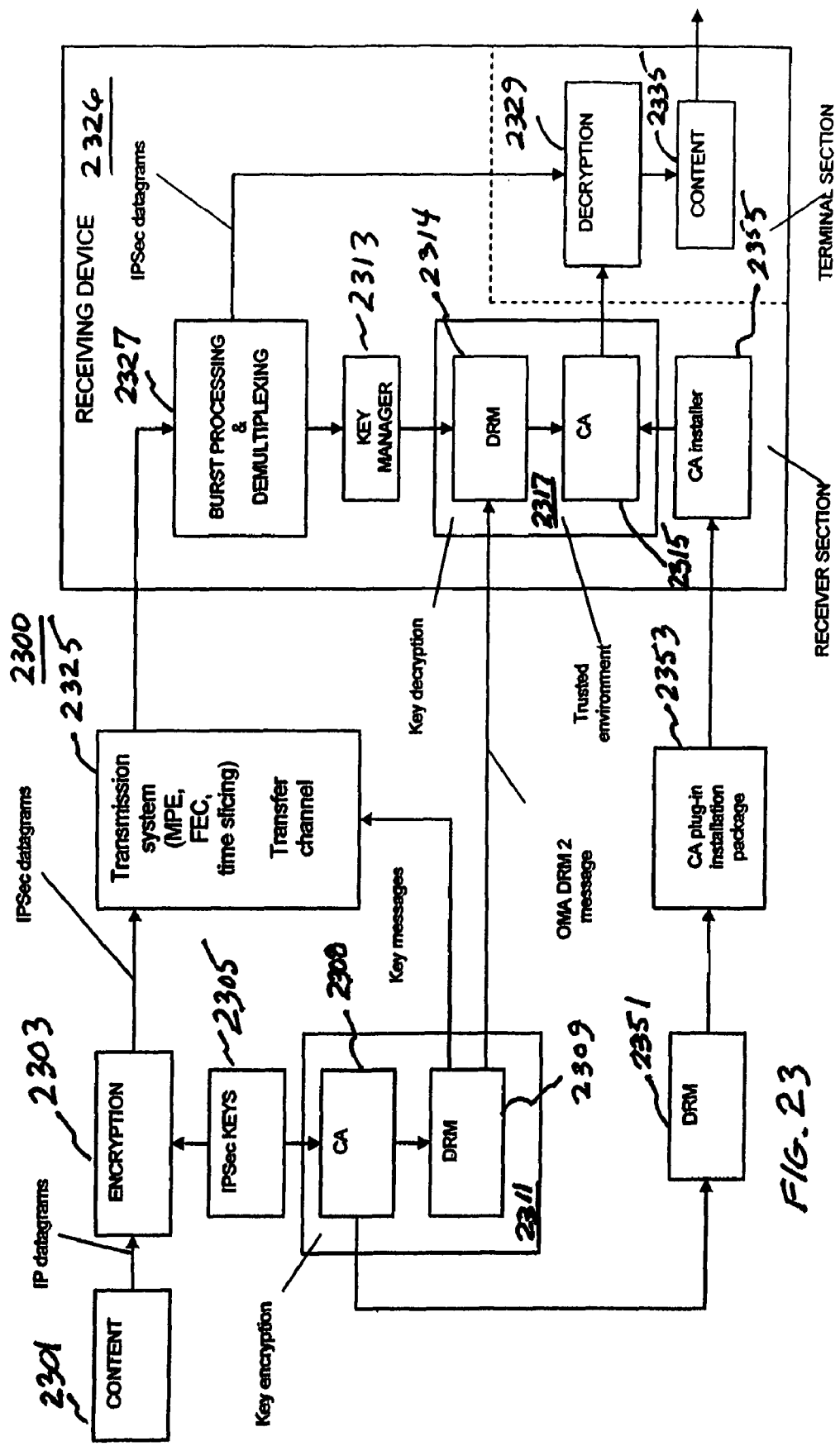
FIG. 23 shows a system that supports DVB-H IPDC services in accordance with an embodiment of the invention.

FIG. 23 shows a system 2300 that supports DVB-H IPDC services in accordance with an embodiment of the invention. System 2300 supports conditional access (CA) that can provide a second-level of encryption using a corresponding private key. (As will be discussed with FIG. 26, IPSec keys may be encrypted by digital rights management (DRM) as well as by a CA module.) Receiving device 2326 comprises a receiver section and a terminal section. The receiver section performs burst processing, demultiplexing, and key management. The receiver section also includes CA plug-in installation and key decryption. DRM 2351 sends CA plug-in installation package 2353 to DRM 2314 so that a new CA plug-in module is installed at receiving device 2326 as will be further discussed with FIG. 27. The key decryption is performed in a secure processing environment. The terminal section performs key management and key decryption in addition to the decryption (corresponding to decryption module 2329) and content rendering (corresponding to content 2335).

Encryption of keys 2305 (which are used to encrypt content 2301 by encryption module 2303) is performed by key encryption module 2311. Key encryption module 2311 comprises CA module 2308 and DRM 2309. Thus, key encryption module 2311 may provide two levels of encryption. Both the encrypted key information and the content datagrams are included in the same time slice burst by transmission system 2325.

Correspondingly, decryption of the received key information is performed by key decryption module 2317. Key decryption module 2317 comprises DRM 2314 and CA module 2315. Key decryption module 2317 performs two levels of decryption that correspond to the two levels of encryption. Burst processing module 2327 decrypts the received content datagrams using the decrypted keys provided by key manager 2313. Received content datagrams are decrypted by decryption module 2329 of the terminal section. Key manager 2313 receives the key information that is demultiplexed by module 2327 and forwards the key information to key decryption module 2317 (which is associated with a trusted environment) for DRM and CA decryption.

In the embodiment, the rights object (RO) is transmitted as an OMA DRM 2 message (according to the proposed Open Mobile Alliance Digital Rights Management Version 2.0) from DRM 2309 to DRM 2314. The rights object is typically transmitted separately from the time slice bursts.

Figure 24:
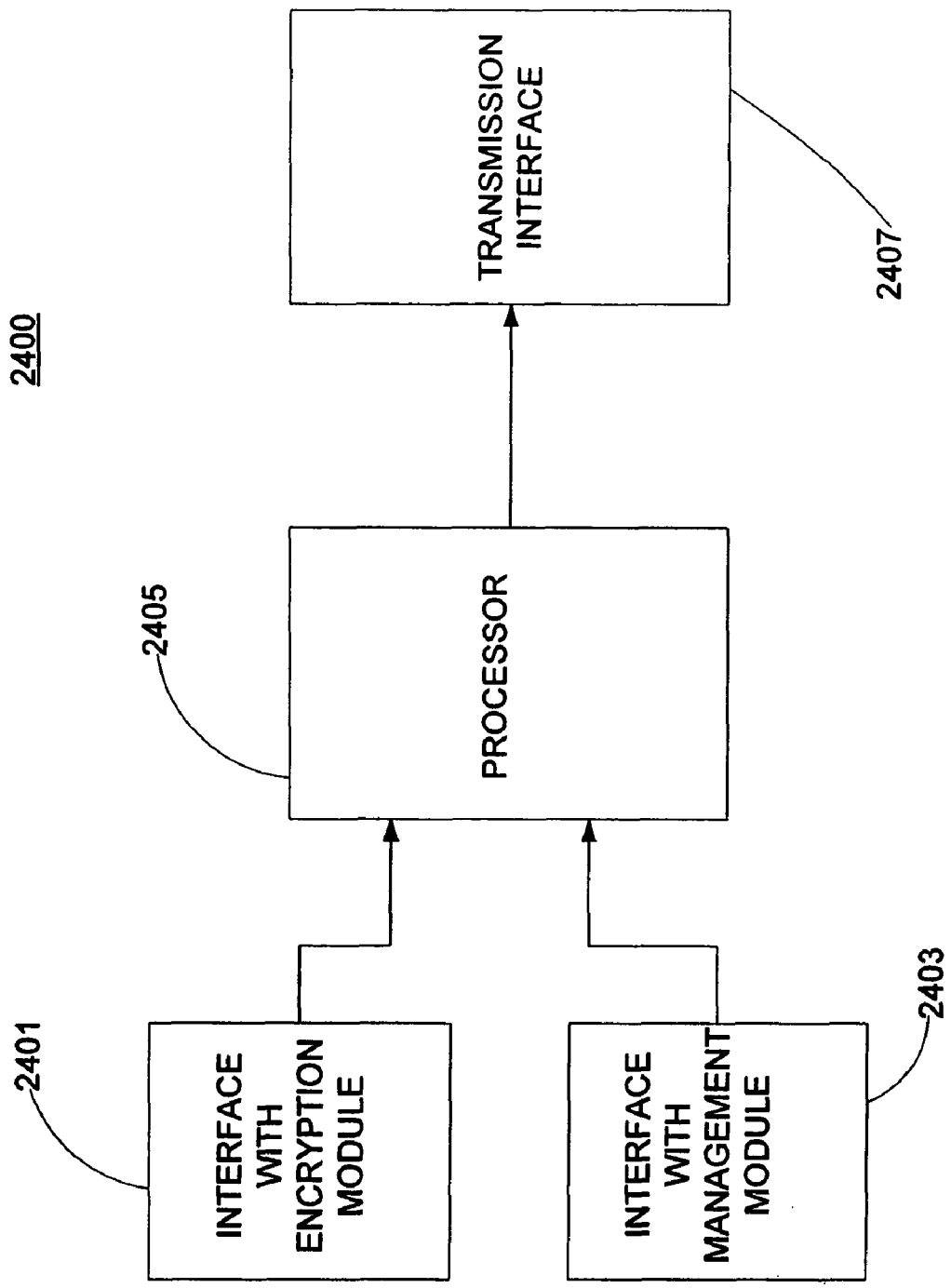
FIG. 24 shows an apparatus for that supports a transmission module as shown in FIGS. 20, 22, and 23 in accordance with an embodiment of the invention.

FIG. 24 shows apparatus 2400 that supports a transmission system (e.g., 2025, 2225, and 2325) as shown in FIGS. 20, 22, and 23 in accordance with an embodiment of the invention. In the embodiment, apparatus 2400 performs functions typically associated with a link layer (the second layer of the OSI protocol model). Processor 2405 obtains encrypted datagrams from an encryption module (not shown) through encryption interface 2401 and corresponding key information from a key generator (not shown) through key interface 2403. Transmission interface 2407 encodes the datagrams for forward error correction at the receiving device, performs multiprotocol encapsulation, and formats the time slice burst with the encoded datagrams. (In the embodiment, the datagrams include both content datagrams and corresponding datagrams containing the keys.)

Figure 25:
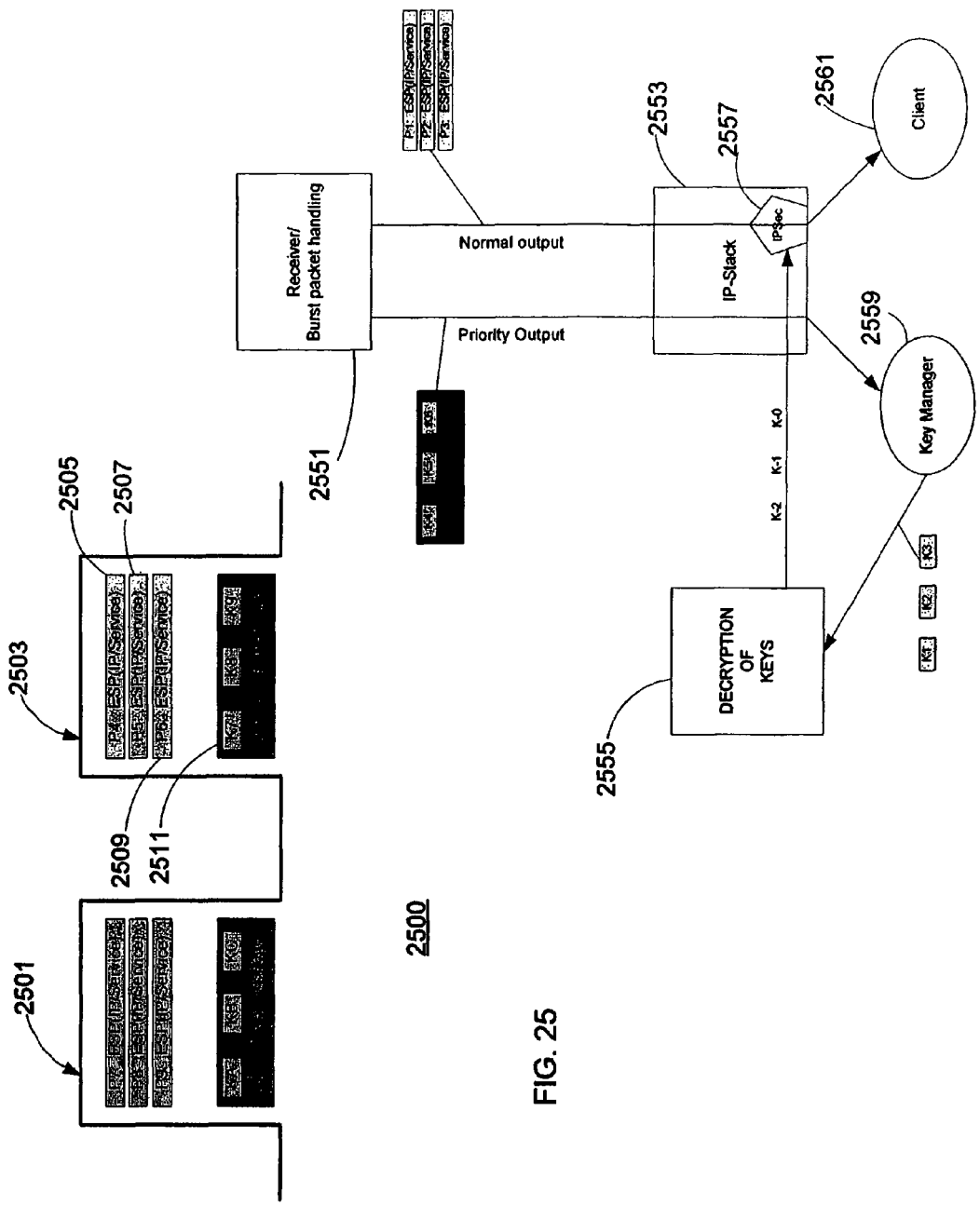
FIG. 25 shows an apparatus that receives a multi-media broadcast and that applies IPSec keys in accordance with an embodiment of the invention.

FIG. 25 shows apparatus 2500 for a receiving device (e.g., receiving devices 1926, 2026, 2226, and 2326 as shown in FIGS. 19, 20, 22, and 23, respectively) that receives a multi-media broadcast and that applies IPSec keys in accordance with an embodiment of the invention. Apparatus 2500 processes a time slice burst (e.g., time slice bursts 2501 and 2503) in order to extract the content datagrams and associated keystream. In the embodiment shown in FIG. 25, time slice burst 2501 or time slice burst 2503 has content datagrams (e.g., content datagrams 2505, 2507, and 2509) with ESP capsulated IP-packets containing service content and corresponding key datagrams (e.g., corresponding datagram 2511) comprising UDP key-messages. The keys in an UDP key-message may be protected with DRM.

Apparatus 2500 is capable of distinguishing between service content and key-messages. Consequently, receiver module 2551 separates content datagrams from key datagrams. In the embodiment, key datagrams are given a higher priority level than content datagrams by the transmitting apparatus (not shown). In the embodiment, the priority level associated with a datagram is indicated by a field, e.g., a type of service (ToS) field or a differentiated services field. Thus, key datagrams are sent to IP stack 2553 before corresponding content datagrams so that more time may be allotted for key processing by key decryption module 2555. Key decryption module is presented encrypted keys from IP stack 2553 through key manager 2559.

The embodiments shown in FIGS. 17 and 25 include the keys in the same time slice burst as the associated content datagram. However, in another embodiment, keys in a time slice burst are associated with decrypting content datagrams that are contained in the next time slice burst, thus allowing more time for key processing.

The decrypted keys are presented to IPSec module 2557 so that the associated content datagrams in IP stack 2553 can be decrypted and presented to client 2561.

Figure 26:
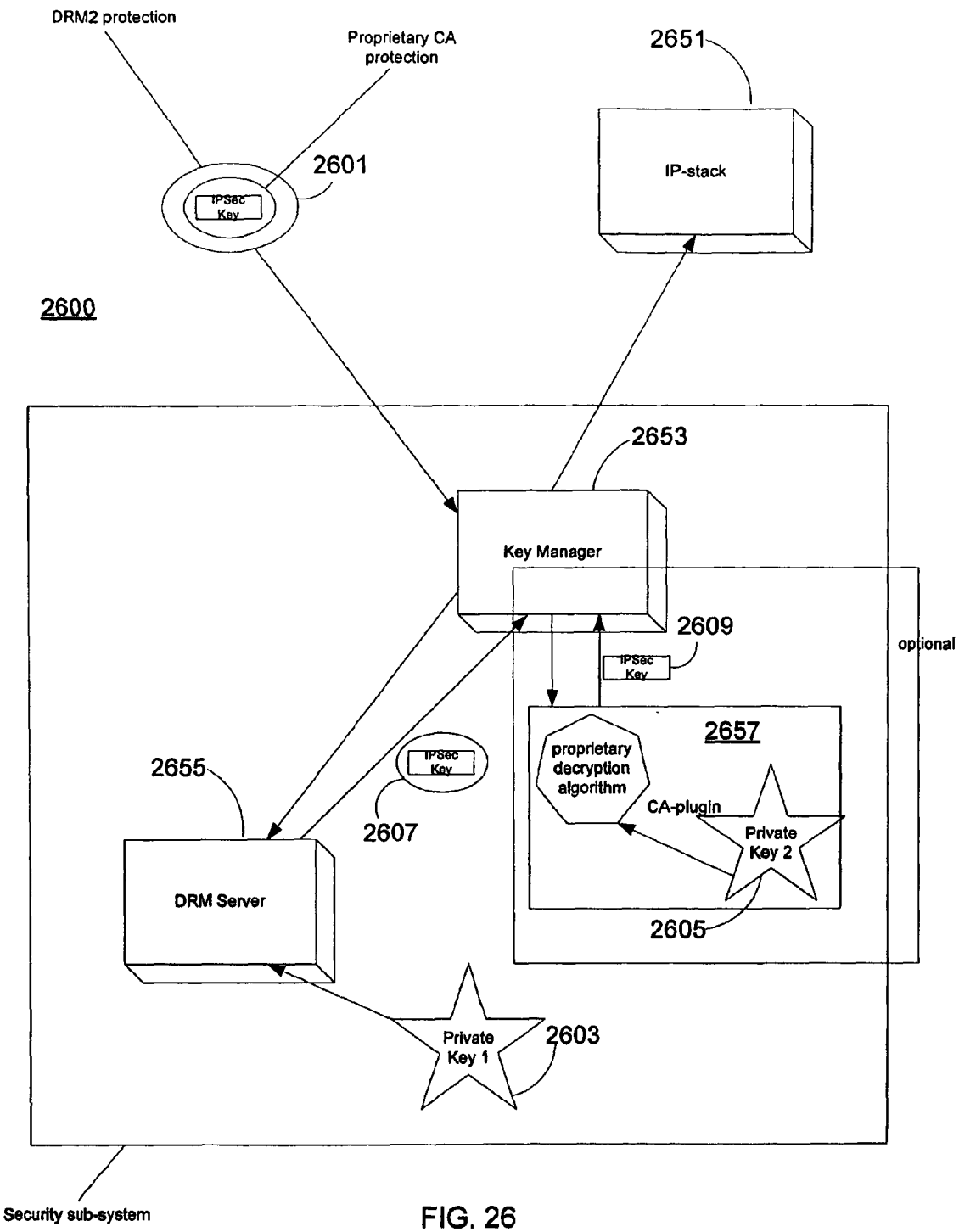
FIG. 26 shows an apparatus that receives a multi-media broadcast and that decrypts the IPSec keys in accordance with an embodiment of the invention.

FIG. 26 shows apparatus 2600 that receives a multi-media broadcast and that decrypts received IPSec keys 2601 in accordance with an embodiment of the invention. Key manager 2653 routes the encrypted IPSec key to DRM server 2655 to decrypt a second-level of encryption using a public decryption algorithm and private key 2603. DRM server 2655 returns second-level decrypted key 2607 to key manager 2653. If the key manager 2653 determines that the key is encrypted with a first-level of encryption, key manager 2653 routes the second-level decrypted key to CA plug-in software module 2657. CA plug-in module 2657 utilizes a secret decryption algorithm and private key 2605 to decrypt second-level decrypted key 2607. In an embodiment of the invention, the secret decryption algorithm corresponds to a DVB common scrambling algorithm (CSA), which is available from the European Telecommunications Standards Institute (ETSI). CA plug-in software module 2657 returns decrypted key 2609 to key manager 2653, which forwards decrypted key 2609 to IP stack 2651.

In the embodiment, CA plug-in module 2657 performs a first-level of decryption that is optional and that is based on an operator-specific CA-method that includes an associated private key and an associated decryption algorithm. The second-level of encryption is based on an open standard, e.g., OMA DRM2. Because the first-level of encryption is optional, key manager 2653 determines whether a first-level of encryption has been applied to second-level decrypted key 2607. If so, key manager 2653 routes second-level decrypted key 2607 to CA plug-in software module 2657. If not, key manager 2653 routes second-level decrypted key 2607 directly to IP stack 2651 because second-level decrypted key 2607 is completely decrypted.

In the embodiment, key manager 2653 determines whether second-level decrypted key 2607 has been first-level encrypted by examining an associated encryption indicator (not shown), e.g., a header or a message field. The associated encryption indicator indicates 'YES' if second-level decrypted key 2607 has been first-level encrypted and 'NO' if second-level decrypted key 2607 has not been first-level encrypted. If second-level decrypted key 2607 has been first-level encrypted, the associated encryption indicator is not first-level encrypted.

Figure 27:
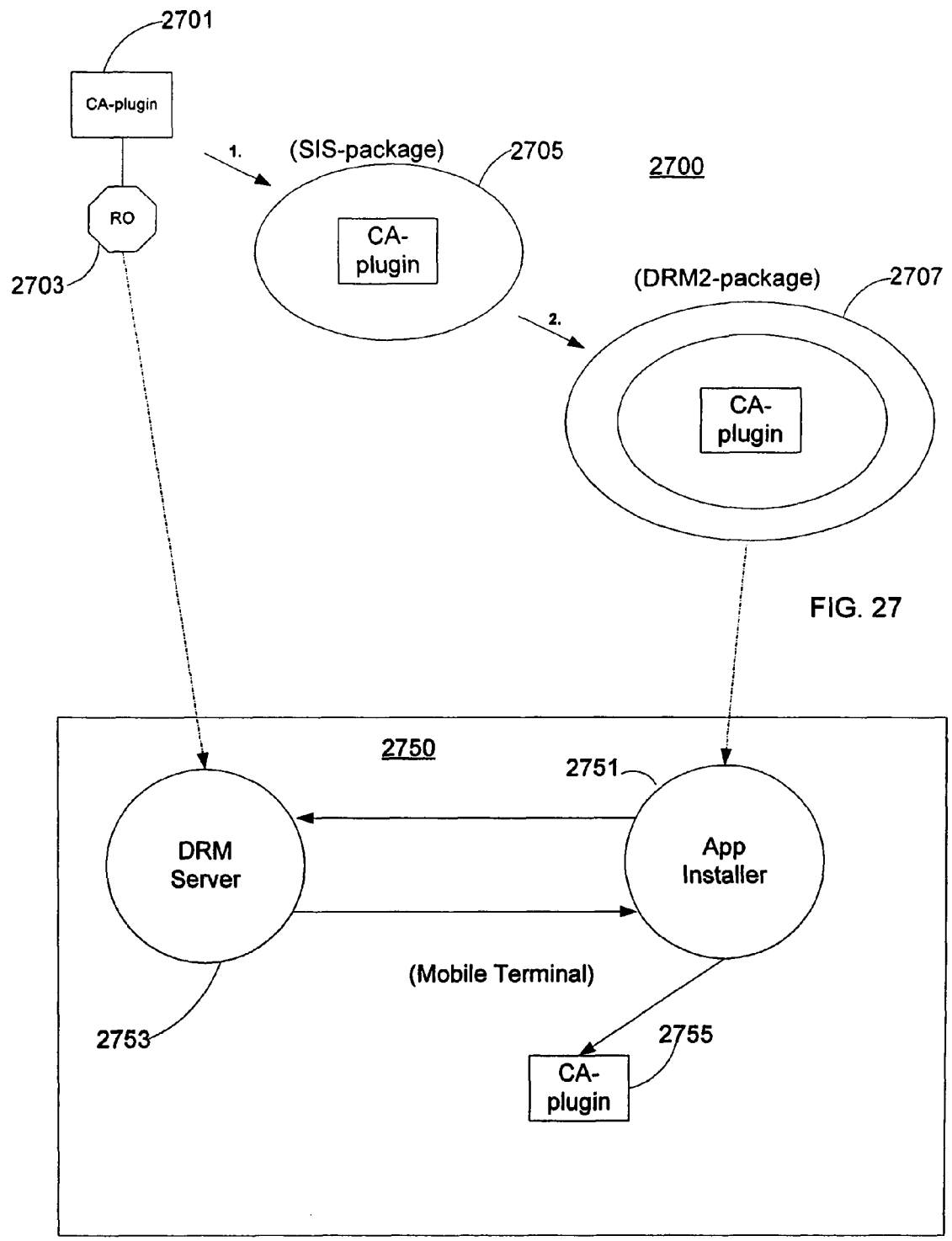
FIG. 27 shows a system for deploying a security plug-in software module in accordance with an embodiment of the invention.

FIG. 27 shows system 2700 for deploying a new security plug-in software module 2701 at receiving device 2750 in accordance with an embodiment of the invention. Security plug-in software module 2701 is formatted as an installation package 2705 (e.g., a SIS file as supported by Symbian). Installation package 2705 is protected (e.g., with OMA-DRM2) to form protected package 2707 and delivered to a receiving device using a delivery mechanism. The embodiment supports different communications channels in a delivery mechanism, including a wireless communications channel in which the receiving device is a wireless terminal. The received protected package 2707 is directed to application installer 2751, which is a trusted application. Application installer 2751 extracts new security plug-in software module 2701 from protected package 2707 and replaces current security plug-in software module 2755 that is currently installed at the receiving device 2750 with new security plug-in software module 2701. In order to extract new security plug-in software module 2701, receiving device 2750 receives rights object 2703 that is processed by DRM 2753. Consequently, DRM 2753 indicates to application installer 2751 that security plug-in software module replacement is permitted.

In embodiments of the invention, component configurations as shown in FIGS. 3-16 may be incorporated in systems as shown in FIGS. 20, 22, and 23.

As can be appreciated by one skilled in the art, a computer system with an associated computer-readable medium containing instructions for controlling the computer system can be utilized to implement the exemplary embodiments that are disclosed herein. The computer system may include at least one computer such as a microprocessor, digital signal processor, and associated peripheral electronic circuitry.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

We claim:

1. A method, comprising:
  receiving, at a first receiving apparatus, a current time slice burst of a plurality of time slice bursts having idle time between consecutive bursts, the current time slice burst including a plurality of data stream components, wherein a current content datagram that includes current content is included as at least part of the plurality of data stream components, and a key datagram that includes key information associated with a subsequent time slice burst is included as at least part of another of the plurality of data stream components;
  decrypting the current content datagram in accordance with a current key to obtain the current content during a multi-media session;
  decrypting the key datagram to obtain a next key;
  receiving the subsequent time slice burst including a subsequent content datagram;
  decrypting the subsequent content datagram in accordance with the next key to obtain subsequent content during the multi-media session; and
  presenting the subsequent content.

2. The method of claim 1, wherein the key datagram comprises an user datagram protocol message.

3. The method of claim 1, wherein the current content datagram and the subsequent content datagram each comprises an encapsulated security payload capsulated Internet protocol packet.

4. The method of claim 1, further comprising:
  determining a priority level for each received datagram based on a priority indicating data field included in each received datagram, wherein each key datagram is associated with a higher priority than each content datagram; and
  transferring each said received datagram to an Internet protocol stack based on the priority level.

5. The method of claim 1, wherein the current key and the next key correspond to Internet protocol level encryption keys.

6. The method of claim 1, wherein the subsequent time slice burst corresponds to a next time slice burst.

7. The method of claim 1, wherein each data stream component of the plurality of data stream components is identifiable from other data stream components of the plurality of data stream components by at least one of a transmission source identifier, a transmission destination identifier, and a transmission port identifier; and the method further comprises:
  separating, by the first receiving apparatus, the plurality of data stream components from the current time slice burst, resulting in a first separated data stream component that includes the current content datagram, and a second separated data stream component that includes the key datagram.

8. The method of claim 7, wherein the second separated data stream component is a dedicated keystream.

9. The method of claim 7, wherein separating the plurality of data stream components from the current time slice burst, results in a third separated data stream component that includes a second key datagram, and the second key datagram includes additional addressing information for the second key datagram and additional key information; and
  wherein the third separated data stream component is a dedicated keystream.

10. The method of claim 7, wherein the transmission source identifier is a source Internet protocol address, and the transmission destination identifier is a destination Internet protocol address.

11. The method of claim 1, wherein the current content is for a data stream associated with a first data rate, and the current time slice burst is received at a second data rate that is greater than the first data rate.

12. One or more non-transitory computer-readable media, storing computer-executable instructions that, when executed, cause a processor to at least:
  receive a current time slice burst of a plurality of time slice bursts having idle time between consecutive bursts, wherein each of the plurality of time slice bursts comprises encrypted content and a key for decrypting the encrypted content, wherein the current time slice burst includes a current content datagram that includes current content, and wherein the current time slice burst includes a key datagram that includes a next key associated with a subsequent time slice burst;

decrypt the current content datagram in accordance with a current key to obtain the current content during a multi-media session;

decrypt key datagram to obtain a next key;

receive the subsequent time slice burst including a subsequent content datagram;

decrypt the subsequent content datagram in accordance with the next key to obtain subsequent content during the multi-media session; and presenting present the subsequent content.

13. The one or more non-transitory computer-readable media of claim 12, wherein the key datagram comprises an user datagram protocol message.

14. The one or more non-transitory computer-readable media of claim 12, wherein the current content datagram and the subsequent content datagram each comprises an encapsulated security payload capsulated Internet protocol packet.

15. The one or more non-transitory computer-readable media of claim 12, further storing computer-executable instructions that, when executed, cause a processor to at least;

determine a priority level for each received datagram based on a priority indicating data field included in each received datagram, wherein each key datagram is associated with a higher priority than each content datagram; and transfer each said received datagram to an Internet protocol stack based on the priority level.

16. The one or more non-transitory computer-readable media of claim 12, wherein the current key and the next key correspond to Internet protocol level encryption keys.

17. The one or more non-transitory computer-readable media of claim 12, wherein the subsequent time slice burst corresponds to a next time slice burst.

18. An apparatus, comprising:

at least one processor; and a computer-readable medium storing executable instructions configured to, with the at least one processor, cause the apparatus to:

receive a current time slice burst of a plurality of time slice bursts having idle time between consecutive bursts, the current time slice burst including a plurality of data stream components, wherein a current content datagram that includes current content is included as at least part of one of the plurality of data stream components, and a key datagram that includes key information associated with a subsequent time slice burst is included as at least part of another of the plurality of data stream components ;

decrypt the current content datagram in accordance with a current key to obtain current content during a multi-media session;

decrypt the key datagram to obtain a next key;

receive the subsequent time slice burst including a subsequent content datagram;

decrypt the subsequent content datagram in accordance with the next key to obtain subsequent content during the multi-media session; and present the subsequent content.

19. The apparatus of claim 18, wherein the key datagram comprises an user datagram protocol message.

20. The apparatus of claim 18, wherein the current content datagram and the subsequent content datagram each comprises an encapsulated security payload (ESP) capsulated Internet protocol packet.

21. The apparatus of claim 18, wherein the computer-readable medium further stores executable instructions configured to, with the at least one processor, cause the apparatus to:

determine a priority level for each received datagram based on a priority indicating data field included in each received datagram, wherein each key datagram is associated with a higher priority than each content datagram; and transfer each said received datagram to an Internet protocol stack based on the priority level.

22. The apparatus of claim 18, wherein the current key and the next key correspond to Internet protocol level encryption keys.

23. The apparatus of claim 18, wherein the subsequent time slice burst corresponds to a next time slice burst.

* * * * *

UNITED STATES PATENT AND TRADEMARK OFFICE
CERTIFICATE OF CORRECTION

PATENT NO. : 8,379,864 B2
APPLICATION NO. : 10/888575
DATED : February 19, 2013
INVENTOR(S) : Tuomo Saarikivi et al.

It is certified that error appears in the above-identified patent and that said Letters Patent is hereby corrected as shown below:

In the Claims

Column 13, lines 60-67:
Please delete "the current time slice burst including a plurality of data stream components, wherein a current content datagram that includes current content is included as at least part of the plurality of data stream components, and a key datagram that includes key information associated with a subsequent time slice burst is included as at least part of another of the plurality of data stream components;"
and insert --wherein each of the plurality of time slice bursts comprises encrypted content and a key for decrypting the encrypted content, wherein the current time slice burst includes a current content datagram that includes current content, and wherein the current time slice burst includes a key datagram that includes a next key associated with a subsequent time slice bursts;--

Column 14, Line 30:
Please delete "The method of claim 1, wherein each data stream"
and insert --The method of claim 1, wherein the current content datagram includes a plurality of data stream components, wherein each data stream--

Column 14, Line 45:
Please delete "claim 7" and insert --claim 8--

Column 14, Line 49:
Please delete "additional addressing information for the second key datagram and"

Column 15, Line 15:
Please delete "presenting"

Signed and Sealed this
Eleventh Day of June, 2013

Teresa Stanek Rea
*Acting Director of the United States Patent and Trademark Office*

CERTIFICATE OF CORRECTION (continued)
U.S. Pat. No. 8,379,864 B2

In the Claims

Column 16, lines 2-9:
　　Please delete "the current time slice burst including a plurality of data stream components, wherein a current content datagram that includes current content is included as at least part of one of the plurality of data stream components, and a key datagram that includes key information associated with a subsequent time slice burst is included as at least part of another of the plurality of data stream components;"
　　and insert --wherein each of the plurality of time slice bursts includes encrypted content and a key for decrypting the encrypted content, wherein the current time slice burst includes a current content datagram that includes current content, and wherein the current time slice burst includes a key datagram that includes a next key associated with a subsequent time slice burst;--

Column 16, Line 21:
　　Please delete "an" and insert --a--